United States Patent
King et al.

(10) Patent No.: US 10,342,227 B2
(45) Date of Patent: *Jul. 9, 2019

(54) INSECT BAIT STAKES

(71) Applicant: Woodstream Corporation, Lititz, PA (US)

(72) Inventors: Andrew King, Malvern, PA (US); Joseph Frank Fiore, Lebanon, PA (US)

(73) Assignee: WOODSTREAM CORPORATION, Lititz, PA (US)

(*) Notice: Subject to any disclaimer, the term of this patent is extended or adjusted under 35 U.S.C. 154(b) by 290 days.

This patent is subject to a terminal disclaimer.

(21) Appl. No.: 14/873,542

(22) Filed: Oct. 2, 2015

(65) Prior Publication Data

US 2016/0095302 A1 Apr. 7, 2016

Related U.S. Application Data

(63) Continuation-in-part of application No. 13/897,224, filed on May 17, 2013, now Pat. No. 9,161,525.

(51) Int. Cl.

| A01M 1/00 | (2006.01) |
|---|---|
| A01M 1/20 | (2006.01) |
| A01M 1/02 | (2006.01) |
| A01M 1/10 | (2006.01) |

(52) U.S. Cl.
CPC ............ *A01M 1/2011* (2013.01); *A01M 1/00* (2013.01); *A01M 1/02* (2013.01); *A01M 1/103* (2013.01)

(58) Field of Classification Search
CPC ........... A01M 1/00; A01M 1/02; A01M 1/103

USPC ................ 43/107, 121, 124, 131, 132.1
See application file for complete search history.

(56) References Cited

U.S. PATENT DOCUMENTS

| 2,547,314 A | 4/1951 | Grant |
| 2,825,996 A | 3/1958 | Grant |
| 2,837,861 A * | 6/1958 | Graham, Sr. ........... A01M 1/04 200/83 D |
| 2,893,160 A | 7/1959 | Grant |
| 3,828,464 A | 8/1974 | Peace |
| 4,065,872 A | 1/1978 | Patton et al. |
| 4,277,907 A * | 7/1981 | Ernest ................. A01M 25/004 43/131 |
| 4,485,582 A | 12/1984 | Morris |
| 5,033,229 A * | 7/1991 | Demarest ............. A01M 1/2011 43/124 |
| 5,379,545 A | 1/1995 | Gall et al. |
| 5,528,854 A | 6/1996 | Antonali et al. |

(Continued)

FOREIGN PATENT DOCUMENTS

| JP | 2002-320437 | 11/2002 |
| JP | 2011-010629 | 1/2011 |

*Primary Examiner* — David J Parsley
(74) *Attorney, Agent, or Firm* — Jacobson Holman, PLLC.

(57) ABSTRACT

An ant bait stake is provided having two components including an outer housing and an inner bait pack or reservoir that is separate from the outer housing. The outer housing includes a bait pack compartment for receiving the bait pack, and a ground engaging member such as a stake. A break-away tab including a neck portion with a bait access channel therein extends outwardly of the housing, the tab being removable by the consumer without any tools or other devices to open the bait access channel when the ant bait stake is ready for use.

19 Claims, 19 Drawing Sheets

(56) References Cited

U.S. PATENT DOCUMENTS

| | | | |
|---|---|---|---|
| 5,548,922 A * | 8/1996 | Wefler | A01M 1/2011 43/131 |
| D400,635 S | 11/1998 | Kinzler et al. | |
| 5,870,853 A | 2/1999 | Williams | |
| 5,873,193 A | 2/1999 | Jensen | |
| 5,901,496 A * | 5/1999 | Woodruff | A01M 1/026 43/124 |
| 5,918,410 A | 7/1999 | Knuppel | |
| 6,016,625 A | 1/2000 | Bishoff et al. | |
| 6,085,942 A | 7/2000 | Redmond | |
| 6,216,384 B1 * | 4/2001 | Dickson | A01M 1/2005 43/131 |
| 6,219,961 B1 | 4/2001 | Ballard | |
| 6,233,861 B1 | 5/2001 | DelVecchio | |
| 6,401,384 B1 | 6/2002 | Contadini et al. | |
| 6,474,015 B1 | 11/2002 | Lund et al. | |
| 6,606,816 B2 * | 8/2003 | Oi | A01M 1/026 106/15.05 |
| 6,796,082 B1 | 9/2004 | Duston et al. | |
| 7,380,370 B2 * | 6/2008 | Livingston | A01M 29/12 239/47 |
| 7,540,111 B2 | 6/2009 | Kraatz | |
| 9,161,525 B2 * | 10/2015 | King | A01M 1/2011 |
| 2005/0000148 A1 | 1/2005 | Kraatz | |
| 2014/0338251 A1 | 11/2014 | King | |

* cited by examiner

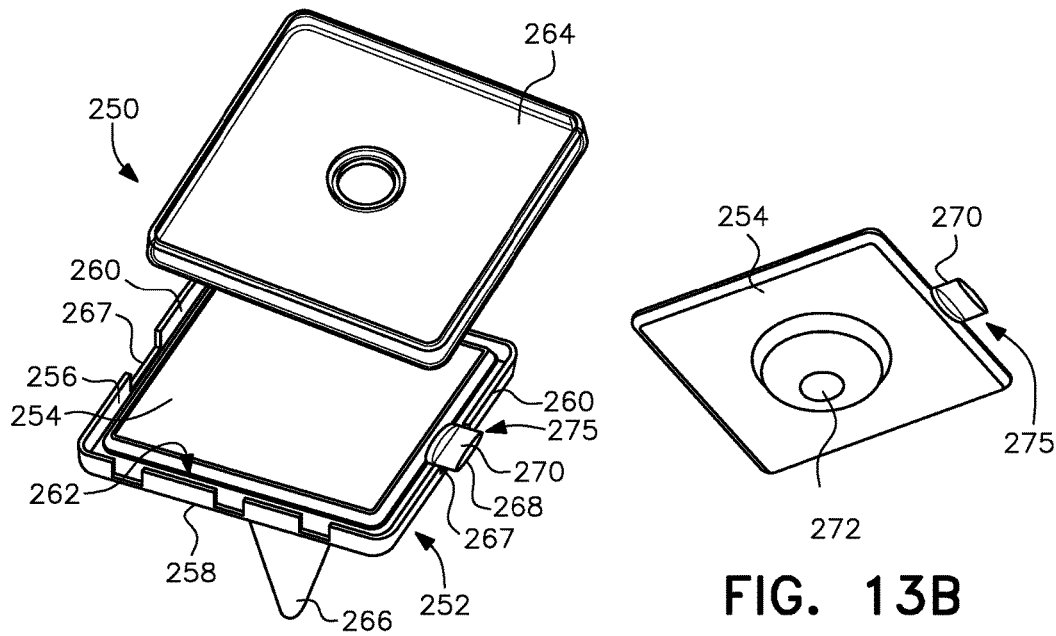
FIG. 13A
FIG. 13B
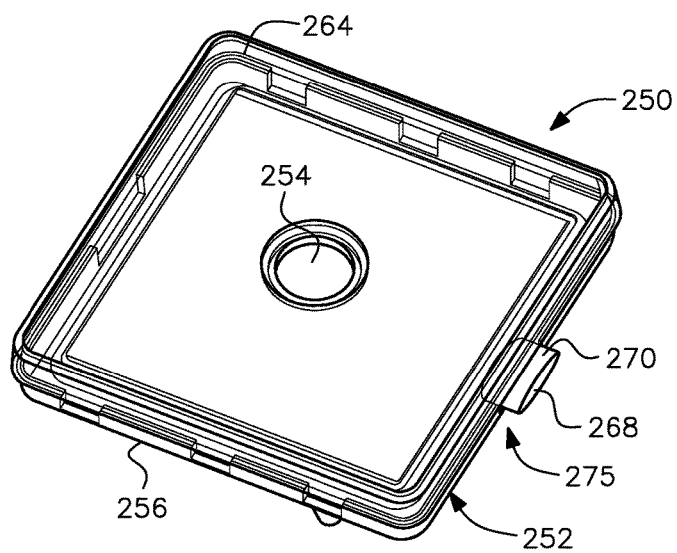
FIG. 13C

INSECT BAIT STAKES

This is a continuation-in-part application of co-pending U.S. application Ser. No. 13/897,224, filed May 17, 2013, and hereby claims the priority thereof to which it is entitled.

BACKGROUND OF THE INVENTION

Field of the Invention

The present invention is related to the field of pest, control and, more particularly, to plastic insect bait assemblies, especially for ants.

Description of the Related Art

Numerous types of bait stations have been developed for attracting and killing insects, through provision of a supply of bait, normally one that is doped with an insecticide, and facilitating the application of the station at a location where it will attract and kill insects through ingestion of the edible bait. More specifically, various types of bait stations, of the type as identified, have been available for some time for attracting roaches, ants, and other type of pests.

For example, an integrally molded insect or ant bait stake is disclosed in U.S. Pat. No. 7,540,111 to Kraatz ("the '111 patent"), which is commonly owned by the assignee of the instant application. The full disclosure of the '111 patent is hereby expressly incorporated by reference as if fully set forth herein.

The ant bait stake of Kraatz is made of two halves that are essentially a mirror image of one another. Each half has an upper reservoir part and a stake segment. When the two halves are sealed together along abutting edges, the two reservoir parts form a whole reservoir that is filled with insecticide. The stake segments are also adhered to one another along their abutting surfaces to form a layered or laminated stake. The bottom of the stake is driven into the ground while the top of the stake extends slightly above the reservoir to form a top edge. The top edge provides a narrow surface that can be impacted, as by a hammer, to drive the stake into the ground. To open the reservoir and provide ants with access to the insecticide contained therein, the user must cut off one corner of the top edge to create an access channel into the reservoir.

Because the two mirror image halves form the insecticide reservoir, the seal between the halves needs to be perfect. Therefore, any defect during manufacturing that allows for a leak between the halves results in the device being unusable and a potential for harmful contamination. Further, the top edge of the stake must be of adequate stiffness and strength to withstand hammering or other application of force to drive the device into the ground. As a result, the user must rely on a separate opening device, such as a knife or scissors, to cut open one corner of the top edge.

Therefore, a need exists for an insect or ant bait stake that overcomes the foregoing drawbacks.

SUMMARY OF THE INVENTION

In view of the foregoing, the present invention is directed to an insect or ant bait stake having at least two components including an outer housing and an inner bait pack or reservoir that is separate from the outer housing. The invention is most often described hereinafter as an ant bait stake; however, it is understood that other small insect pests may also be advantageously drawn to the bait stake. Therefore, use of the term "ant bait stake" herein is not intended to limit the present invention to use of the stake for ants only but is intended to encompass any small pest insect.

According to a first embodiment, the outer housing has a main component and a minor component. The main component includes a bait pack compartment for receiving the bait pack, and a ground engaging stake that is integral with and extends below the bait pack compartment. The bait pack compartment includes a top plate having a flat upper surface and a bottom wall with a substantially flat bottom surface. The interior of the compartment receives the bait pack which has a stepped incline inside the bait pack to assist the ants in gaining access to the bait. The minor component includes a door coupled along one edge to the bait pack compartment of the main component by a living hinge. When the bait pack is positioned within the bait pack compartment, the door is pivoted on the living hinge and secured to the bait pack compartment of the main component to close off the bait pack compartment. Preferably the door includes an open slot or window which aligns with the stepped incline of the bait pack to allow the consumer to observe the ants climbing down and up the stepped incline of the bait pack.

The integral ground engaging stake extends below the bottom wall of the bait pack compartment and is configured as a V-shaped plate with a pointed tip to facilitate driving of the stake into the ground. The stake also includes ribs that extend generally perpendicular to the plate and increase the strength and buckling resistance of the stake. The top ends of the plate and ribs abut the bottom surface of the bait pack compartment bottom wall.

The flat upper surface of the top plate provides a stable surface for the consumer to push on when inserting the stake into the ground. The flat bottom surface of the bottom wall of the bait pack compartment acts as a positive stopping point for the depth of the stake when the stake is being inserted into the ground.

The bait pack compartment and the door include complementary structures that securely seal the bait pack compartment of the outer housing once the bait pack has been placed in the bait pack compartment and the door closed. Placement of the bait pack in the bait pack compartment is completed during manufacture so that the consumer does not have to undertake any assembly steps. The bait pack is preferably formed of clear or near-clear plastic and includes a neck portion with an access channel in the form of a break-away tab that extends outwardly of the side of the housing. By breaking off the tab, the access channel can be easily opened by the consumer without the need for any tools or other devices when the ant bait stake is ready for use. After the tab is removed, the outer edge of the reservoir neck portion protrudes only slightly from the side of the housing. When the insecticide in the ant bait stake has been consumed or the stake is made otherwise of limited effect, the consumer simply disposes of the entire ant bait stake as a unit.

According to a second embodiment, the outer housing and inner bait pack or reservoir have a substantially horizontal orientation in use. The housing includes a base member forming a bait pack compartment and a cover that is secured to the base member with a snap fit to enclose a bait pack in the bait pack compartment. As in the first embodiment, the bait pack includes at least one break-away tab having a neck portion with an access channel therein. The break-away tab extends outwardly of the side of the housing base member and is easily broken off by the user to open the access channel in the neck portion when the ant bait stake is ready for use. An integral ground-engaging stake projects downwardly from the lower surface of the housing base member and is substantially perpendicular thereto so that when the stake is pushed into the ground the housing lies substantially flat on the ground surface. The horizontal orientation of the housing with the bait pack therein places the access channel near ground level, making it very easy for ants crawling on the ground to find and enter the channel.

According to a third embodiment, the bait pack is slidably inserted into an opening formed in, or an open side of, an outer housing. The housing includes a bottom wall and a plurality of side walls that define a bait pack compartment. A ground-engaging stake extends downwardly from the bottom wall. The bait pack receiving compartment is accessible for insertion of the bait pack through an open top or an open side of the housing. The bait pack is held in place in the bait pack receiving compartment by a snug frictional fit between the outer edges of the bait pack and adjacent inner surfaces of the housing. The snug fit prevents the bait pack from falling out of the housing but also enables the user to remove and replace the bait pack while reusing the housing. At least one break-away tab having a neck portion with an access channel therein is formed in the side of the bait pack near the top thereof. The break-away tab extends outwardly from one of the side walls of the housing and is broken off by the user to open the access channel as in the previous embodiments.

According to a fourth embodiment, the housing has a slightly convex upper surface with a slightly concave lower surface that gives the housing a shell-type configuration. Extending downwardly from at least one edge of the shell-like housing is a ground engaging side wall that is preferably integral with the shell-like housing. A bait pack or reservoir is secured, against the concave lower surface of the housing, such as with a snap fit, and has at least one break-away tab including a neck portion with an access channel therein that extends outwardly through an opening in the ground-engaging side wall adjacent the shell-like housing's upper surface. In use, the ground engaging side wall or side walls are forced into the ground so that the generally convex upper surface of the shell-like housing has a horizontal orientation that is nearly flush with the ground surface. As in the second embodiment, the horizontal orientation of the housing and the bait pack places the access channel or channels of the bait pack near ground level, facilitating ant entry.

According to a fifth embodiment, the housing is configured as a substantially hollow capsule having a generally cylindrical upper portion with an open top and a conical lower portion with a pointed tip. Two opposing slits are formed in the side wall of the lower portion. The slits extend in a generally vertical orientation from an upper end near the cylindrical portion to a lower end that is spaced above the pointed tip. A bait pack having a generally rectangular shape is inserted into the open top and pushed downwardly into the conical lower portion. When fully inserted, the two bottom corners of the bait pack pass through the two opposing slits, respectively, to project outwardly from the conical lower portion at a point vertically spaced above the pointed tip, while the upper end of the bait pack projects above the rim of the cylindrical portion. The bait pack has at least one break-away tab including a neck portion with an access channel therein that extends outwardly from the bait pack upper end as in the other embodiments. In use, the cylindrical upper portion of the capsule and the upper end of the bait pack remain above the ground surface while the conical lower portion of the capsule, and the lower end of the bait pack inserted therein, are forced into the ground.

Accordingly, it is an object of the present invention to provide an insect or ant bait stake having a two-piece design including an outer housing and a separate reservoir or bait pack that is fully sealed prior to use to prevent any inadvertent release of its contained insecticide while being easily opened without tools prior to use of the bait stake and being disposable together with the housing when the bait stake is empty or otherwise no longer useful.

Another object of the present invention is to provide a molded polymer insect or ant bait stake in accordance with the preceding object in which the housing has a flat top panel that provides a stable surface for the consumer to press against, such as by stepping on, to force the bait stake into the ground, and having reinforcing structures so as to add sufficient strength to the stake during installation thereof.

A further object of the present invention is to provide an insect or ant bait stake in accordance with the preceding objects that includes a bottom wall with a flat bottom surface on the lower side of the bait pack compartment of the outer housing which provides a positive stopping point for the insertion depth of the stake into the ground.

Yet another object of the present invention is to provide an insect or ant bait stake in accordance with the preceding objects which has a separate bait pack with at least one break-away tab extending outside the housing to enable the consumer to easily create an opening into the bait pack through which ants can enter and exit without the need for any tools.

A still further object of the present invention is to provide an insect or ant bait stake in accordance with the preceding objects that is fully assembled and sealed during manufacture and disposed of as a unit after use.

A further object of the present invention is to provide a uniquely shaped insect or ant bait stake in accordance with the preceding objects that has a separate clear or near-clear plastic bait pack configured with a stepped interior in which the steps serve as landing areas for the ants as they move into and through the bait pack or reservoir to attain access to its insecticide, and an opening or window in the outer housing that enables the consumer to see the ants moving on the stepped interior.

Still a further object of the present invention is to provide an insect or ant bait stake in accordance with the preceding objects having a bait pack that is created using a flat piece of material off of roll stock that is folded in half, scored and then being fed through heating, forming and cutting dies to create the bait pack.

Another object of the present invention is to provide an insect or ant bait stake having a housing that is generally horizontal in use so as to be generally parallel with the ground, the horizontal orientation placing the access channel to the bait pack at or near ground level, making it very easy for ants crawling on the ground to find and enter the channel.

Still another object of the present invention is to provide an insect or ant bait stake having a reusable housing and disposable bait packs that can be removed from and replaced in the housing by the user.

Yet another object of the present invention is to provide an insect or ant bait stake in accordance with the preceding object in which the bait packs are slidably received in the housing and retained therein with a snug frictional fit between the outer edges of the bait pack and adjacent inner surfaces of the housing.

A further object of the present invention is to provide an insect or ant bait stake in accordance with the preceding two objects in which the upper end of the bait pack is exposed or projects from the housing to facilitate removal and replacement of the bait pack.

A still further object of the present invention is to provide an insect or ant bait stake in accordance with the preceding three objects in which at least part of the bait pack is forced into the ground with a lower part of the housing.

Another object, of the present invention is to provide an insect bait stake that is not complex in structure and which can be manufactured at low cost and efficiently constructed, while being easy to use and effective in controlling ants and other insects.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4-1 is an enlarged partial perspective view from the top plate side of the interior of the housing shown in FIG. 4.

FIG. 4-2 is an enlarged partial view from the bottom wall side of the interior of the housing shown in FIG. 4.

FIG. 13A is a partially exploded view of an ant and insect bait stake according to a second embodiment of the present invention showing the bait pack in the base member of the housing with the cover member of the housing being separated from the base member.

FIG. 13B is a bottom view of the bait pack shown in FIG. 13A, showing the bowl-shaped protrusion formed in the lower surface to increase the bait-containing capacity of the bait pack.

FIG. 13C is a perspective view of the ant and insect bait stake shown in FIG. 13A, as fully assembled.

DETAILED DESCRIPTION OF THE PREFERRED EMBODIMENTS

Figure 1:
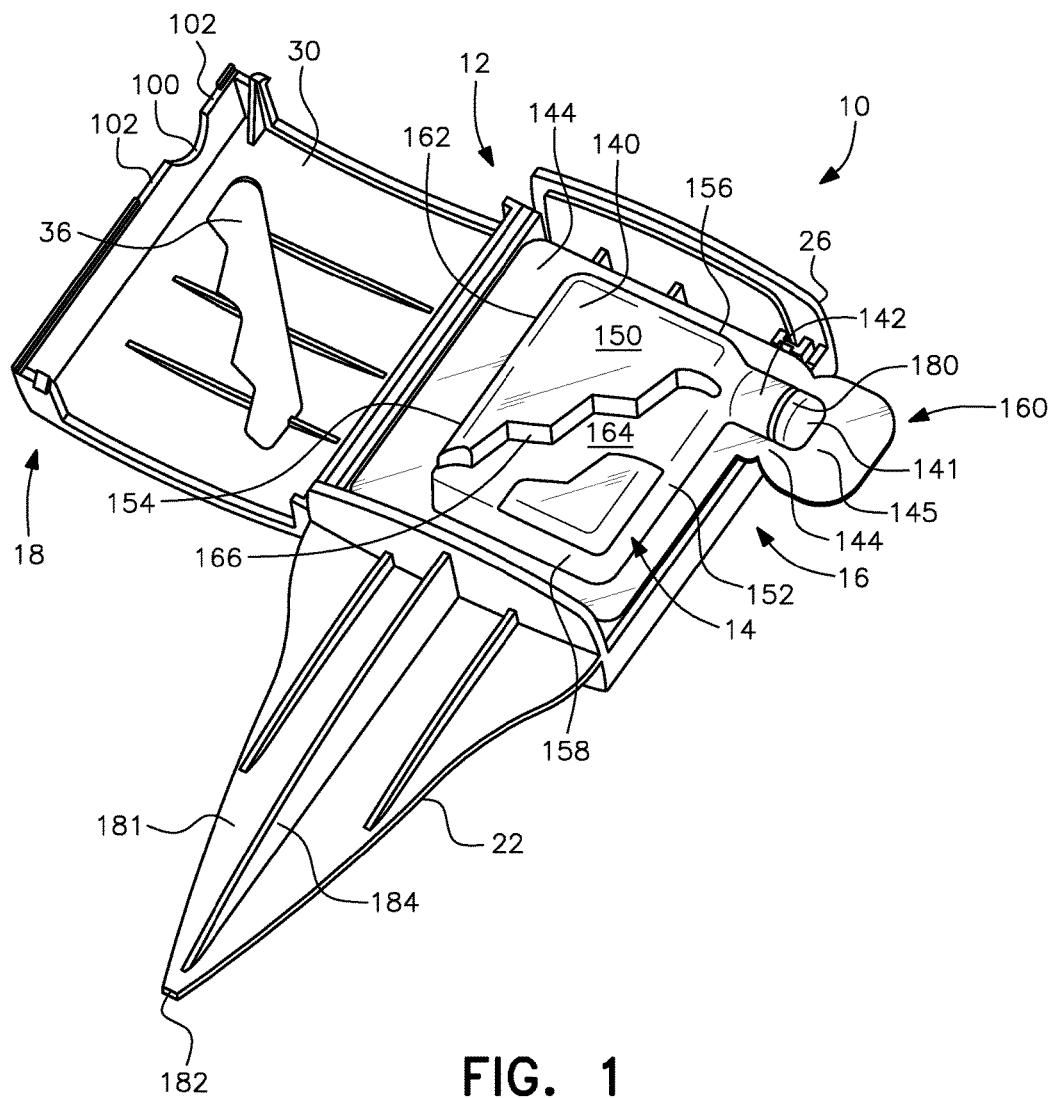
FIG. 1 is a bottom front perspective view of an ant and insect bait stake according to the first embodiment of the present invention, showing the bait pack within the bait pack compartment of the outer housing prior to sealing of the bait pack compartment.

In describing preferred embodiments of the invention illustrated in the drawings, specific terminology will be resorted to for the sake of clarity. However, the invention is not intended to be limited to the specific terms so selected and it is to be understood that each specific term includes all technical equivalents which operate in a similar manner to accomplish a similar purpose.

Figure 2:
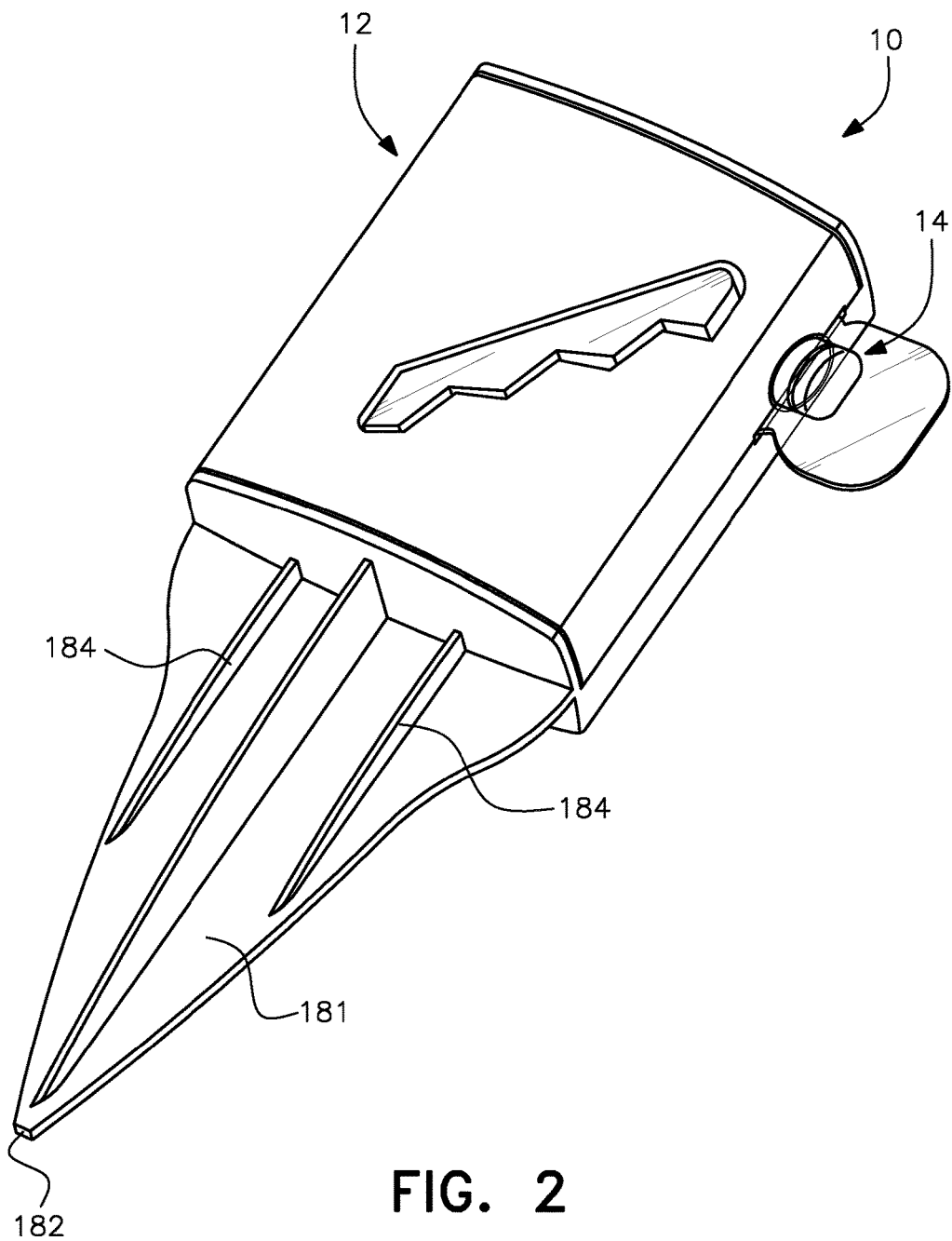
FIG. 2 is a bottom front perspective view of the ant and insect bait stake shown in FIG. 1 after sealing of the bait pack compartment.
Figure 3:
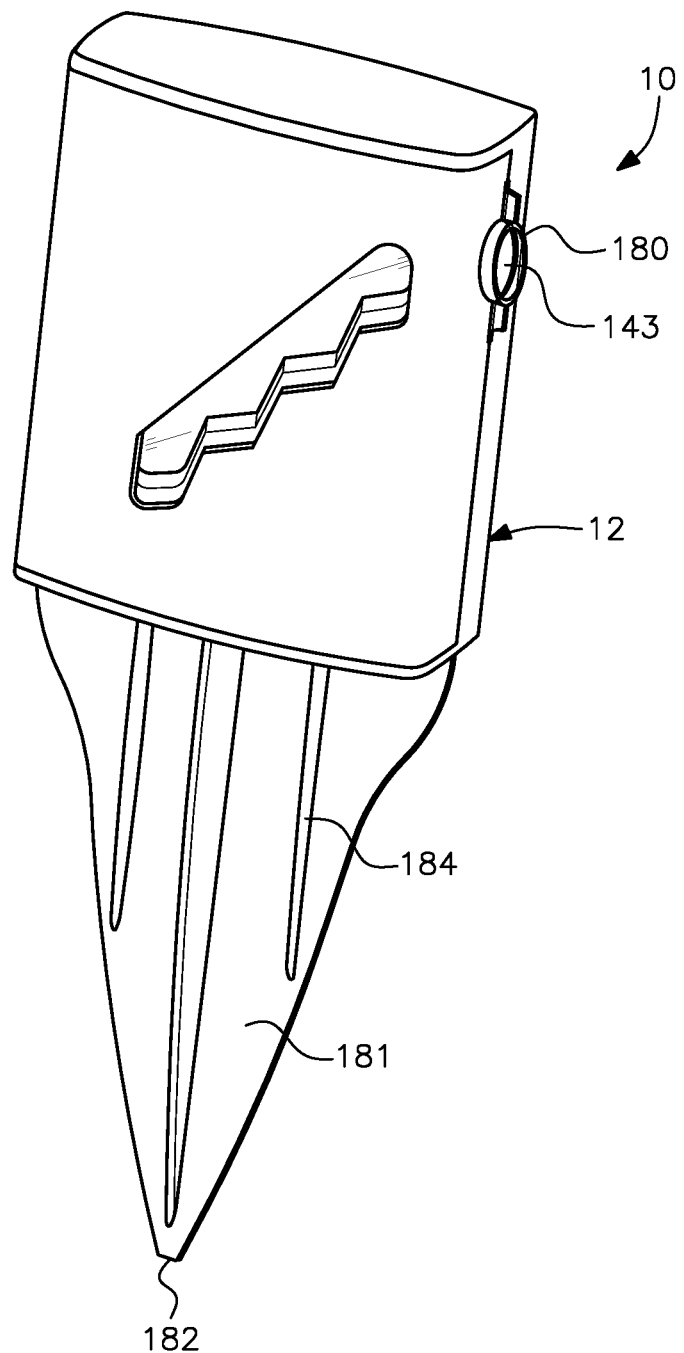
FIG. 3 is a top front perspective view of the sealed ant and insect bait stake shown in FIG. 2 after removal of the break-away tab to create an access channel into the bait pack or reservoir.

As shown in FIGS. 1-3, the present invention is directed to an ant and insect bait stake generally designated by reference numeral 10. The bait stake has two components including an outer housing generally designated by reference numeral 12 and an inner reservoir or bait pack generally designated by reference numeral 14 that is separate from the outer housing 12.

Figure 4:
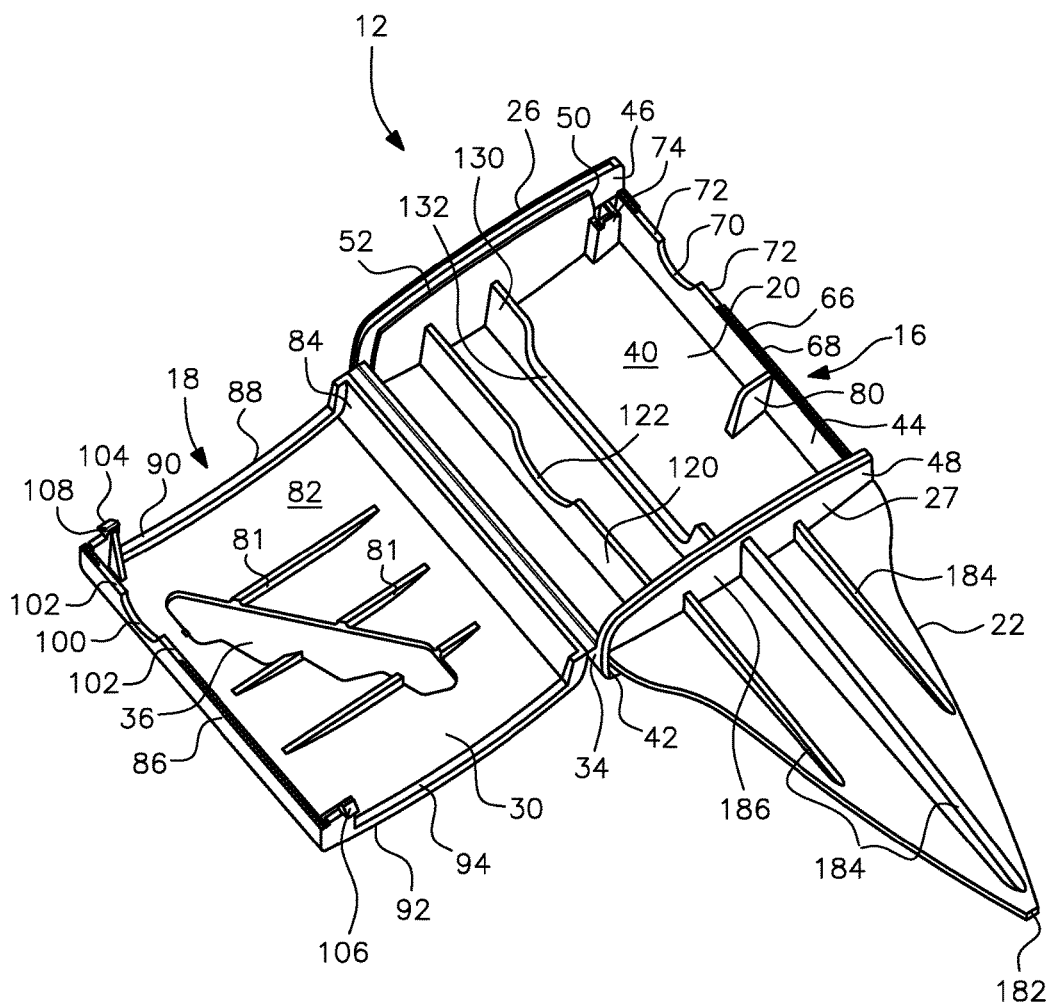
FIG. 4 is an upper perspective view of the housing of the ant and insect bait stake shown in FIG. 1, but without the bait pack.
Figures 1, 4:
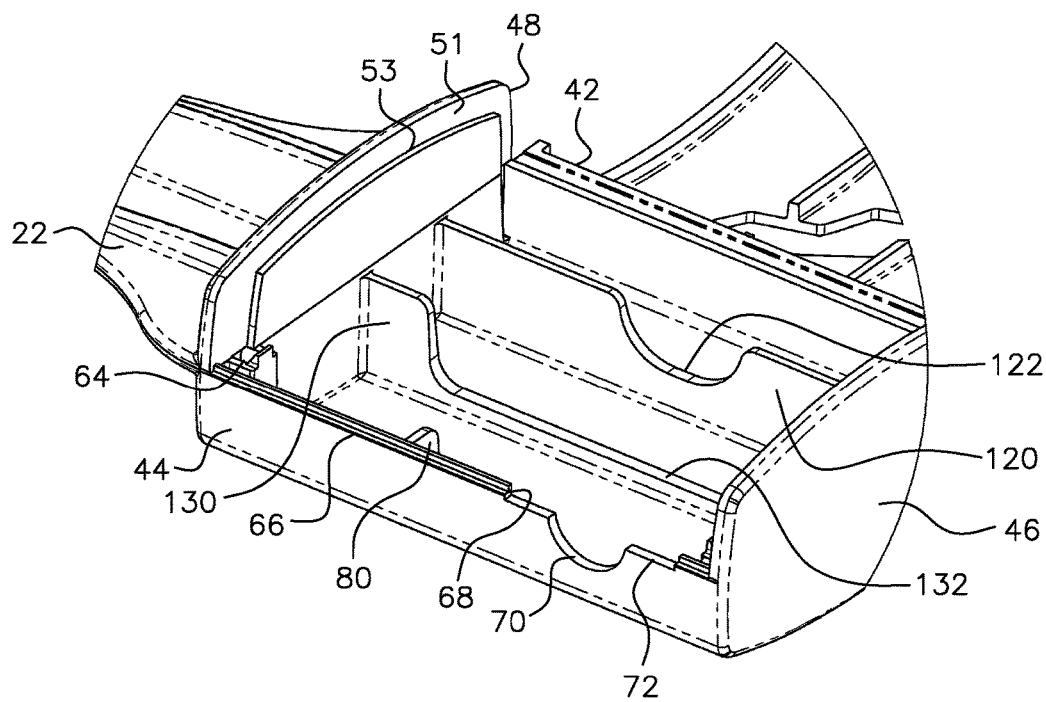
Figures 2, 4:
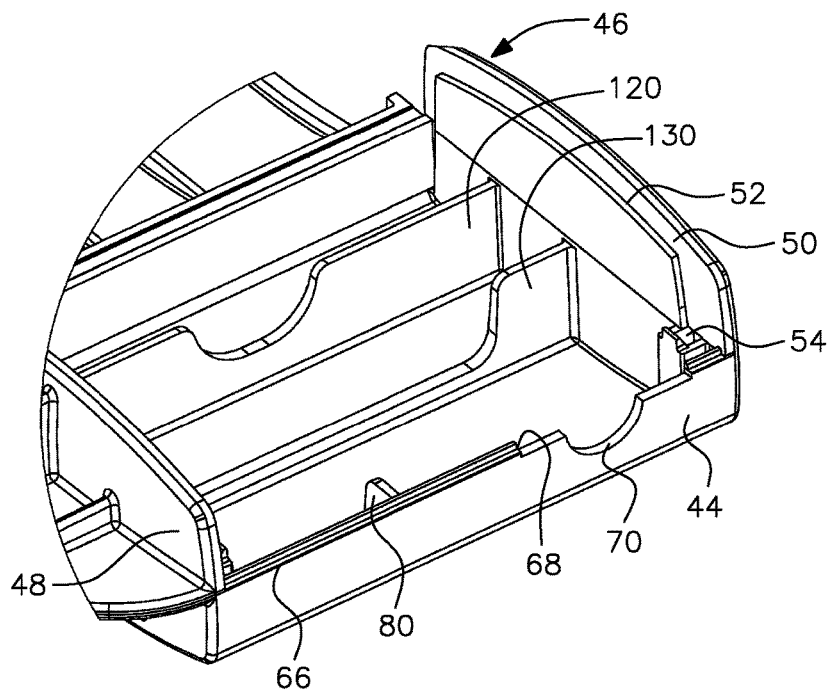

The outer housing 12, shown in isolation in FIG. 4, has a main component generally designated by reference numeral 16 and a minor component generally designated by reference numeral 18. The main component 16 includes a bait pack compartment 20 for receiving the bait pack 14, and a ground engaging stake 22 that is integral with and extends below the bait pack compartment 20. The top of the bait pack compartment includes a top plate 46 having a flat upper surface 26 and the bottom of the bait pack compartment is defined by a bottom wall 48 having a flat bottom surface 27.

The minor component 18 includes a door 30 coupled along one edge 32 to the bait pack compartment 20 of the main component 16 by a living hinge 34. When the bait pack 14 is positioned within the bait pack compartment 20 daring manufacture, the door 30 is pivoted on the living hinge 34 and secured to the main compartment 16 to seal the bait pack compartment 20. Preferably the door 30 includes a window 36 which allows the consumer to observe the ants climbing down the stepped incline 28 formed in the bait pack 14 as will be described hereinafter.

The bait pack compartment 20 includes a primary outer wall 40, a first side outer wall 42, a second side outer wall 44, the top plate 46 and the bottom wall 48. The terms "first" and "second" are intended only for clarity as either side could be designated the first side outer wall or the second side outer wall.

The first and second side outer walls 42, 44 are generally parallel with one another and spaced from one another by the top plate 46 and the bottom wall 48. Similarly, the top plate 46 and bottom wall 48 are generally parallel with one another and spaced from one another by the first and second side outer walls 42, 44. The four outer walls are each generally perpendicular to the primary outer wall 40. The wall 40 may be flat but is preferably slightly curved so that the outer side of the wall 40 is convex.

As shown in the enlarged partial views of FIGS. 4-1 and 4-2, the top plate 46 includes a lip 50 that forms a shoulder 52 on the inner side of the top plate. The top plate 46 further includes an upper backing ledge 54 (see FIGS. 4-2, 7 and 8) formed adjacent the second side outer wall 44. The bottom wall 48 similarly includes a lip 150 that forms a shoulder 152 on the inner side of the bottom wall 48 (see FIGS. 4-1), and further includes a lower backing ledge 64 formed adjacent the second side outer wall 44 (see FIG. 7). The terms "upper" and "lower" refer to the positioning of the ledges relative to one another when the device is in use.

Figure 5:
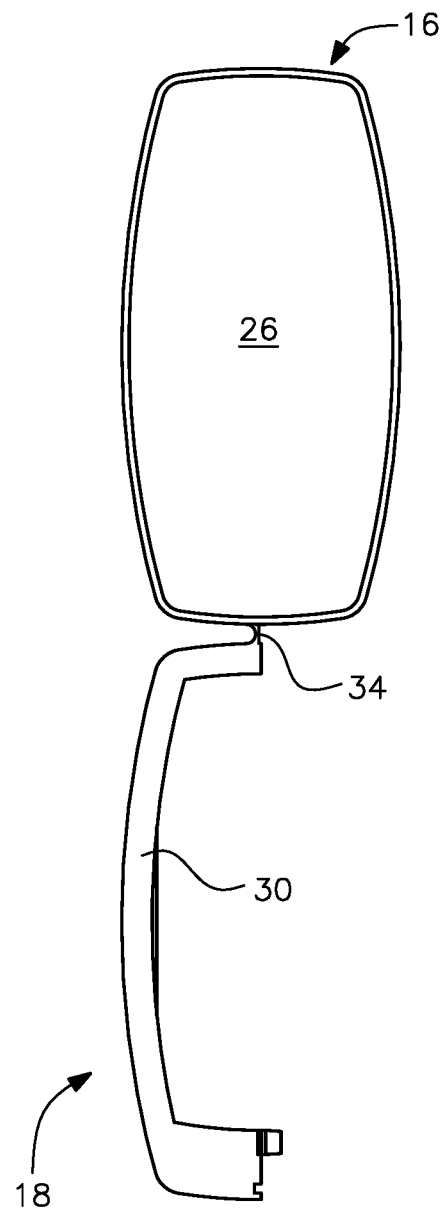
FIG. 5 is a top view of the housing shown in FIG. 4, illustrating the living hinge.
Figure 6A:
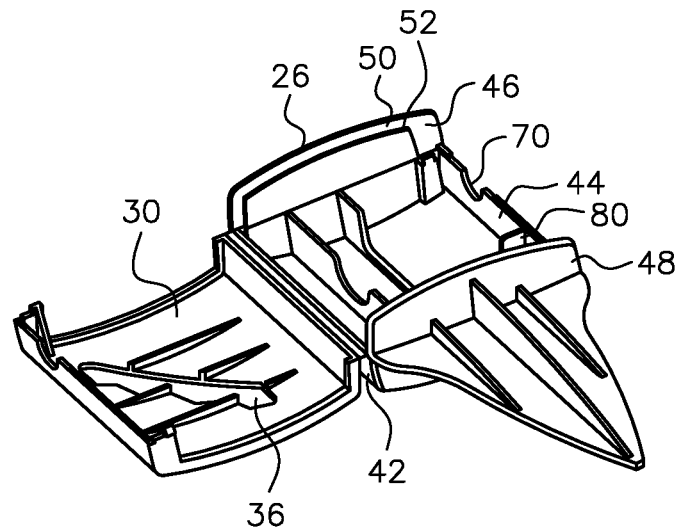
FIGS. 6A-6D are upper perspective views showing the process of closing the door to seal the bait pack compartment shown in FIG. 4.
Figure 6B:
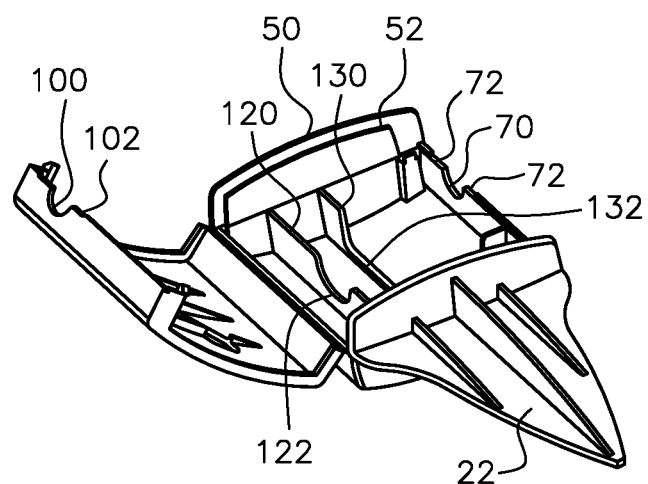
Figure 6C:
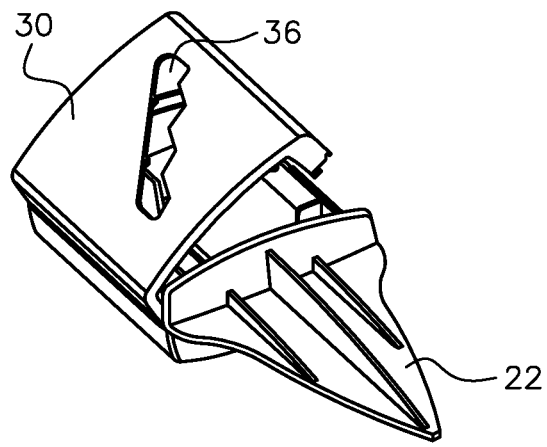
Figure 6D:
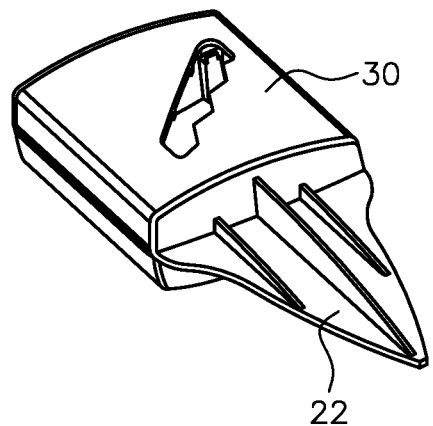

The first side outer wall 42 is coupled to the door 30 by the living hinge 34, best seen in FIG. 5. The living hinge 34 is preferably made of thinned polypropylene. The second, side outer wall 44 has an upper edge 66 with a groove 68 that extends longitudinally along the edge (see FIGS. 4-1 and 4-2). The second side outer wall 44 also has a cutout 70 in proximity to the top plate 46. The cutout 70 is preferably semicircular. A generally rectangular cutout 72 is formed adjacent and on either side of the semicircular cutout.

Each end of the second side outer wall 44 has an upwardly projecting member 74 formed adjacent a respective one of the upper backing ledge 54 and the lower backing ledge 64. Each projecting member 74 is spaced from its respective backing ledge 54, 64 by a narrow channel 78 (see FIGS. 7-8). The second side outer wall also has an inwardly directed tab 80 that is generally perpendicular to the second side outer wall and inwardly spaced from the ends thereof.

The door 30 has a primary door panel 82, a first door side panel 84 and a second door side panel 86. The first and second door side panels 84, 86 are generally parallel with one another and separated by the primary door panel 82. The primary door panel 82 may be flat but is preferably slightly curved so that an outer side of the primary door panel is convex. Preferably, the inner surface of the primary door panel 82 has ridges 81 that assist in locating the bait pack and also strengthen the door. As with the bait pack compartment walls, the terms "first" and "second" may be assigned to either side panel. However, having identified the first and second bait pack compartment walls in the manner discussed above, the first and second door side panels have been designated as set forth herein in order for their positioning to correspond with the first and second side outer walls 42, 44. Further, as used, hereinafter with respect to other components, the terms "first" and "second" are similarly assigned to correspond in position with other elements already so defined.

The primary door panel 82 has an upper edge 88 with an upper ledge 90 and a lower edge 92 with a lower ledge 94. As previously noted, the terms "upper" and "lower" refer to the positioning of the edges and their respective ledges relative to one another when the device is in use. The upper ledge 90 of the primary door panel 82 comes into abutment with the shoulder 52 on the inner side of the top plate 46 of the bait pack compartment 20 when the door is closed, thereby preventing the door from being pushed in. In a similar manner, the lower ledge 94 of the primary door panel comes into abutment with the shoulder (not shown) on the inner side of the bottom wall 48 of the bait pack compartment when the door is closed. The upper and lower edges 88, 92 are generally parallel with one another.

The first door side panel 84 is coupled to the first side outer wall 42 of the bait pack compartment 20 by the living hinge 34. The second door side panel 86 has a door cutout 100 in proximity to the upper edge 88 of the primary door panel 82. The door cutout 100 is preferably semicircular. A generally rectangular door cutout 102 is formed adjacent and on either side of the semicircular door cutout 100. The second door side panel 86 also has a first projecting clip 104 adjacent the upper edge 88 of the primary door panel and a second projecting clip 106 adjacent the lower edge 92 of the primary door pane 1. Each of the projecting clips 104, 106 has a hooked end 108.

Figure 7:
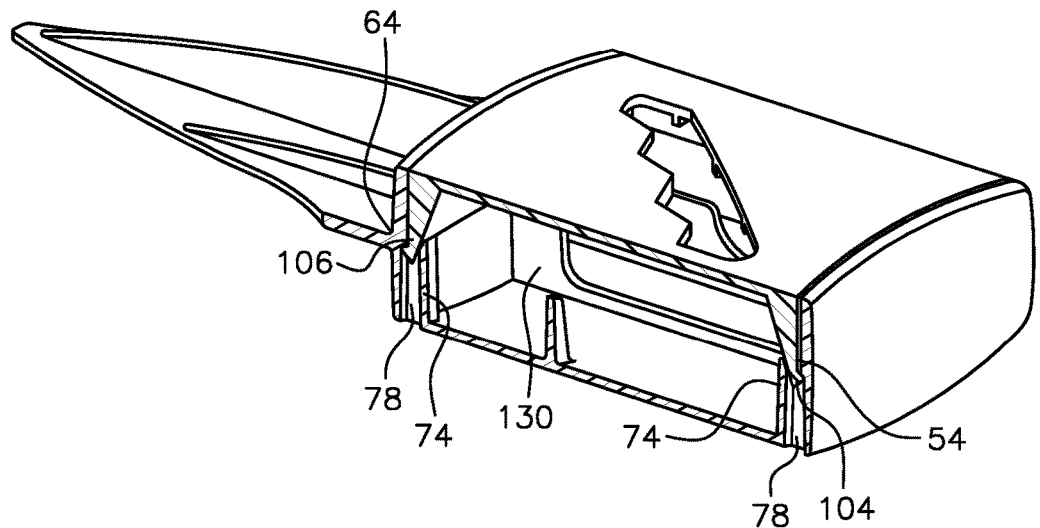
FIG. 7 is a side perspective, cutaway view of the housing shown in FIGS. 4 and 6A-6D, showing the clip and ledge structures used to lock the door against the bait pack compartment and seal the bait pack compartment.
Figure 8:
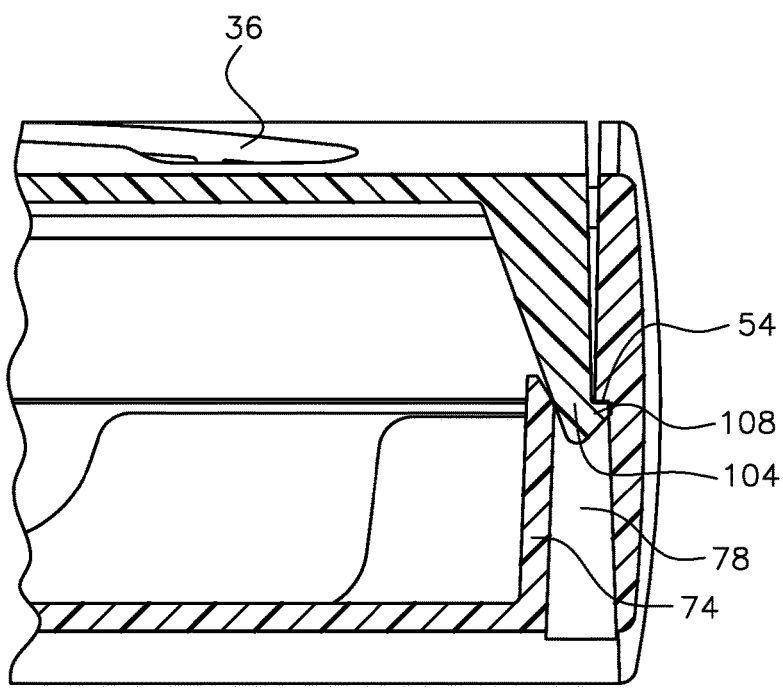
FIG. 8 is an enlarged cut-away side view of the clip and ledge structures shown in FIG. 7.

Closing of the door is illustrated in the sequence shown in FIGS. 6A-6D. Once closed, the projecting clips 104, 106 on the second door side panel 86 are respectively received within the narrow channels 78 formed between the projecting members 74 and the backing ledges 54, 64 as shown in FIGS. 7 and 8. The hooked ends 108 of the clips 104, 106 engage with the backing ledges 54, 64 with a "snap fit" to lock the door in the closed position. More particularly, the backing ledges force the clips into position and greatly increase the difficulty of opening the housing once the clips are engaged.

Extending inwardly from the inner side of the primary outer wall 40 of the bait pack compartment 20 are two bait pack locating ribs 120, 130 (see FIG. 4). The first bait pack locating rib 120 has a semicircular cutout 122 in the longitudinal center region thereof. The second bait pack locating rib 130 has an elongated, generally rectangular, longitudinally extending cutout 132. The two ribs 120, 130 are generally parallel with one another and perpendicular to the inwardly directed tab 80 on the second side outer wall 44.

Figure 9:
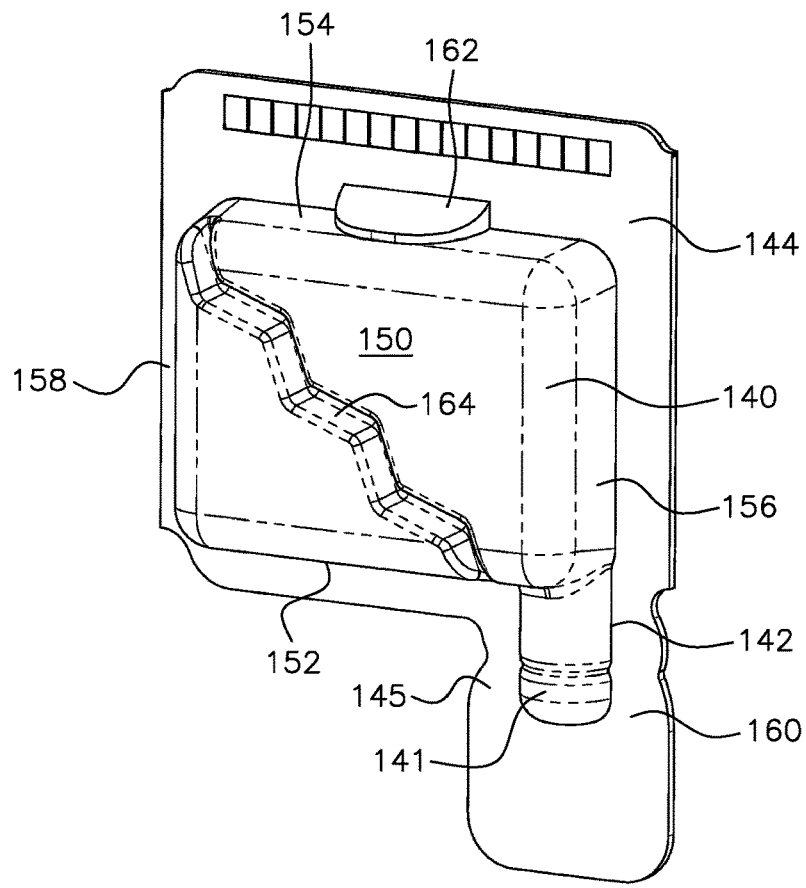
FIG. 9 is a side perspective view of the bait pack shown in FIG. 1.
Figure 10:
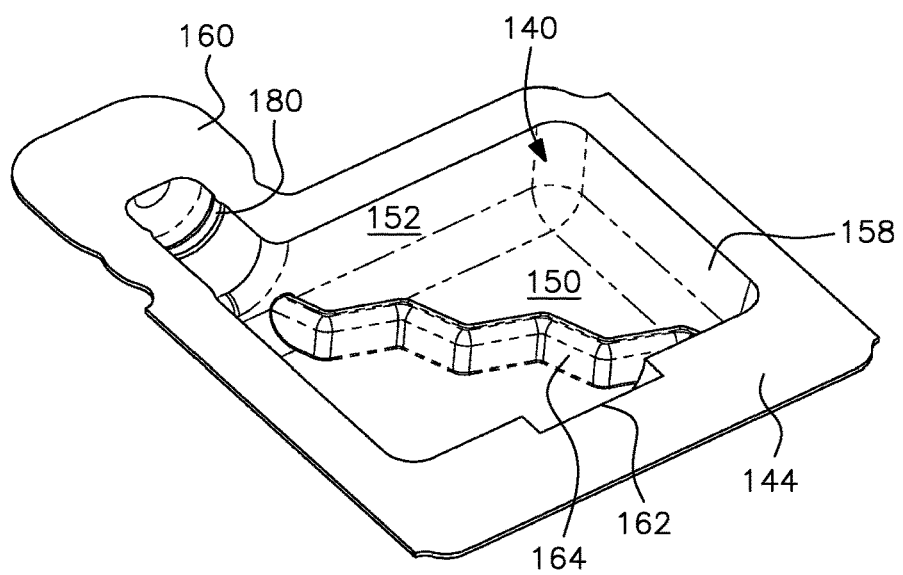
FIG. 10 is a perspective interior view of the well of one half of the bait pack shown in FIG. 9.
Figure 11:
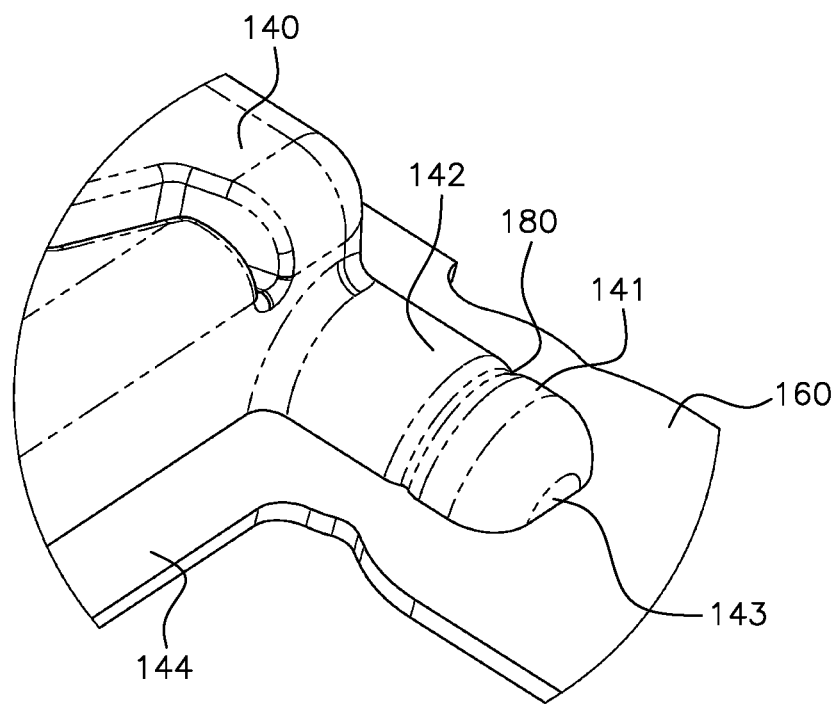
FIG. 11 is an enlarged partial view of the neck portion and break-away tab of the bait pack shown in FIG. 9.

As shown in FIGS. 9-11, the bait pack 14 is a separate component from the housing and is preferably formed to have two sides of clear or near-clear plastic that are essentially mirror images of one another. Each side of the bait pack includes an insecticide holding well 140, an outwardly projecting generally horizontal neck portion 142 defining an access channel 143 (see FIG. 3), a generally planar outer edge 144 that surrounds the well and the neck portion 142, and a stepped incline 164 projecting into the well. While both sides of the bait pack are preferably mirror images of one another, this correspondence is not required as it is only necessary that the two sides mate along their edges to form a sealed bait pack compartment as will be discussed more fully hereinafter.

When the two sides are sealed along their edges to form a single bait pack compartment, one of the bait pack halves constitutes an inner half and the other constitutes an outer half. As used herein the "inner" half is that side of the bait pack that is placed into abutment with the inner surface of the bait pack compartment, while the "outer" half is that side of the bait pack that is adjacent the door when the door is closed to seal the bait pack compartment 20.

The well 140 is generally rectangular and includes a primary wall 150, a first side wall 152, a second side wall 154, an upper wall 156 and a lower wall 158. The first and second side walls 152, 154 are generally parallel with one another and spaced from one another by the upper and lower walls 156, 158. Similarly, the upper and lower walls 156, 158 are generally parallel with one another and spaced from one another by the first and second side walls 152, 154. Each of the four walls is generally perpendicular to the primary wall 150. An interior view of the well 140 is shown in FIG. 10.

Figure 12A:
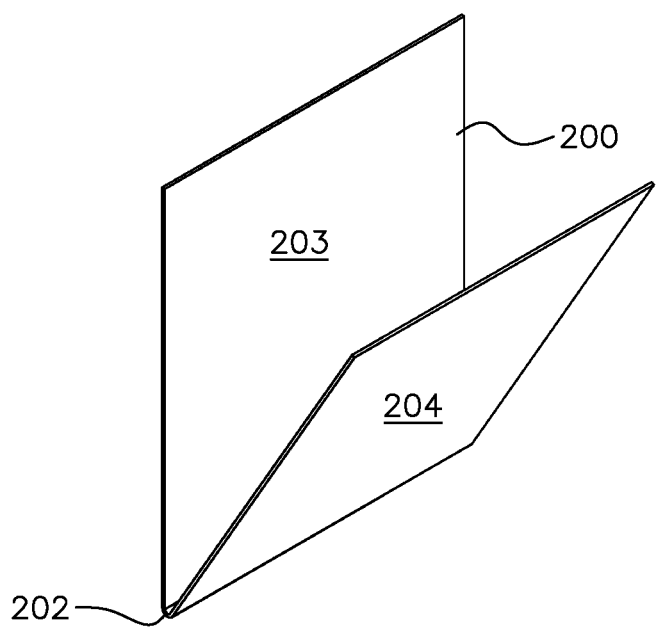
FIGS. 12A-12E show a sequence of manufacturing steps for production of the bait pack shown in FIG. 9.

According to one method of manufacture, the bait pack 14 is formed by folding a flat piece of film material 200 along a folding line 202 as shown in FIG. 12A to effectively create the two sides or halves 203, 204. The halves are then brought into abutment with one another and sealed to one another along a desired sealing line 210 that corresponds with the outer edges 144 of the bait pack. In particular, the sealing line 210 defines the well 140 and a break-away tab, generally designated by reference numeral 160, that surrounds the neck portion 142 and seals the access channel 143. A score 180 (see FIG. 11) is made in the neck portion of each half, by a process not shown, and before sealing of the halves. The score 180 facilitates breaking off of the break-away tab 160 as will be further discussed hereinafter.

Figure 12B:
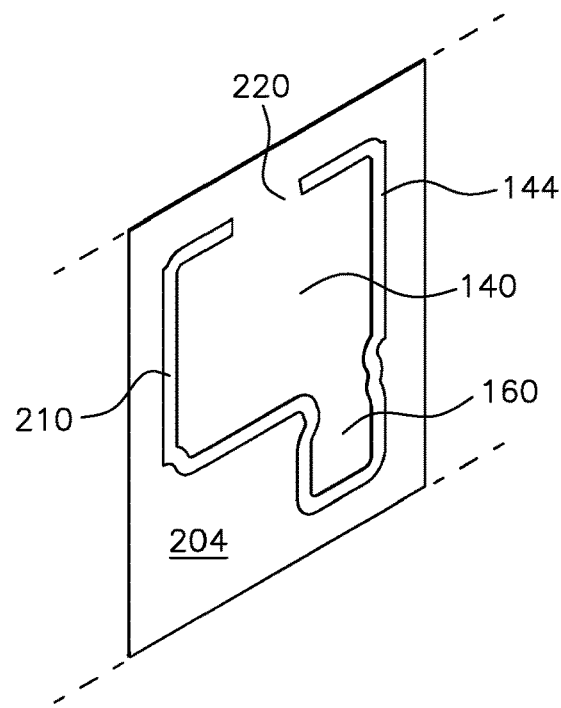
Figure 12C:
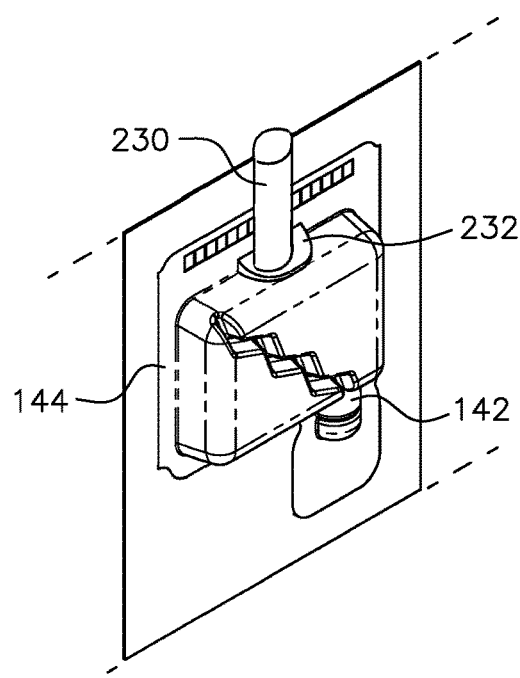
Figure 12D:
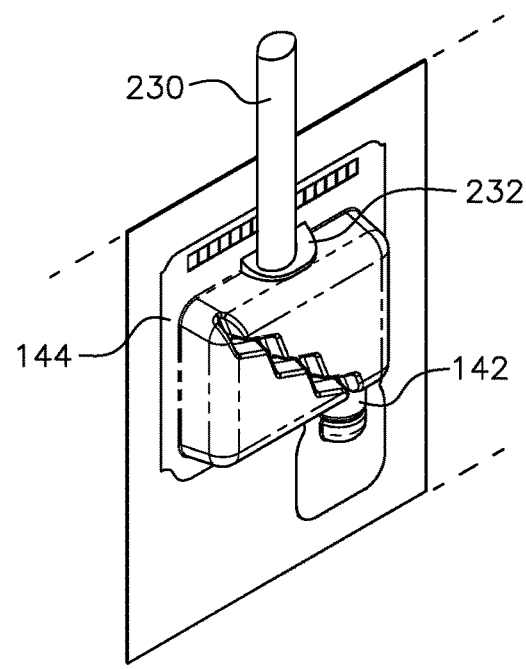
Figure 12E:
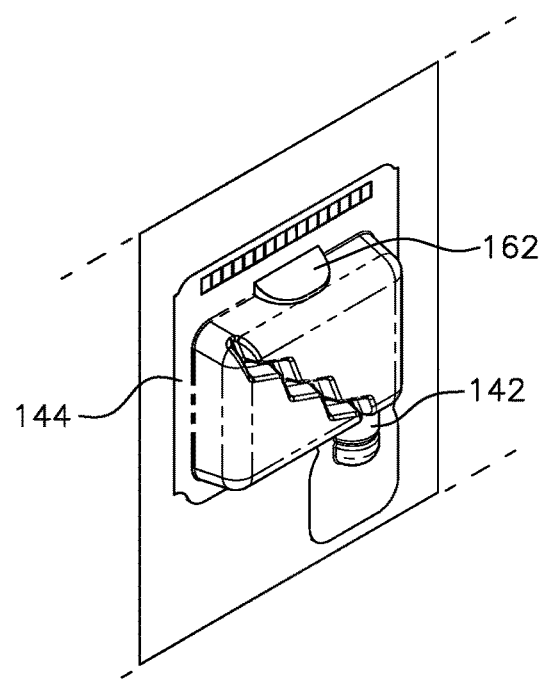

As shown in FIG. 12B, an opening is left in the sealing line to provide a fluid input channel 220. The central area surrounded by the sealed outer edges that will form the well 140 is also unsealed. The folded piece of film material 200 sealed along the sealing line 210 is then placed into a two-sided mold (not shown) that is pre-formed to create the desired bait pack shape including the inner contour of the well 140 as shown in FIG. 10. Air is injected through a tubular member 230 placed into the fluid input channel 220 as shown in FIGS. 12B and 12C. A flange 232 is formed around the tubular member 230 to ensure a tight seal around the tubular member. The air forces each half 203, 204 of the film material outwardly and into abutment with a respective inner side of the mold (not shown), forming a single sealed bait pack compartment 14 having the desired bait pack shape, including the well, neck portion, outer edge and break-away tab. Insecticide is then introduced into the well of the bait pack compartment through the tubular member 230 (see FIG. 12D), after which the tubular member is removed. The fluid input channel 220 and flange 232 are then sealed to leave a semi-circular projection 162 on the second side wall 154 as seen in FIG. 12E.

When the device is ready for use, the neck portion 142 projects from the first side wall 152 of the well 140 adjacent the corner formed by the intersection of the well first side wall 152 and the well upper wall 156 (see FIG. 2). An outer end 141 of the neck portion 142 and that portion 145 of the outer edge 144 surrounding the outer end 141 form the break-away tab 160 that protrudes outwardly from the first side wall 152. The break-away tab 160 provides an easy way for the consumer to open the access channel 143 into the bait pack without tools as will be described more fully hereinafter.

The semi-circular projection 162 on the outer surface of the second side wall 154, formed during manufacture as described above is received within the semicircular cutout 122 formed in the first bait pack locating rib 120. While the projection 162 is a by-product of the manufacturing process, necessitating the cutout 122 in the first bait pack locating rib 120, the projection in conjunction with the cutout may also serve to secure the positioning of the bait pack 14 within the bait pack compartment 20.

Since only the inner half of the bait pack is received within the bait pack compartment, the outer half of the bait pack may be constructed without the molded semi-circular projection, i.e., the outer half of the bait pack does not have to be a mirror image of the inner half. A bait pack having differently shaped sides would be produced using a different pre-formed mold as would be understood by persons of ordinary skill in the art. However, it is preferred that the two halves have identical structure for greater ease and simplicity in manufacture.

The pre-formed mold used to create the bait pack disclosed herein is shaped to form the stepped incline 164 of each half. After blow-molding of the bait pack, the stepped inclines 164 extend toward one another but do not extend fully across the interior of the wells so that there is a space between the two stepped inclines 164. The space is desirable to provide for manufacturing tolerances and also to prevent possible trapping of the bait as might occur if the inclines were in abutment with one another.

The stepped inclines 164 extend from the access channel 143 at the upper end of the first side wall 152, adjacent the well upper corner, downwardly to the lower wall 158 of the well adjacent the well corner that is diagonal to the well upper corner. The stepped inclines 164 make it easier for the ants to move from the access channel 143 in the neck portion 142 down into the bottom of the well 140 and then back up. The stepped inclines 164 also reduce the chances that the ants will drown which is desirable as it is intended that the worker ants consume the bait and then survive long enough to carry the liquid back to the nest and deliver a dose to the rest of the ant colony.

The stepped incline 164 in each half of the bait pack forms a correspondingly stepped recess 166 in the outer surface of the primary wall 150. The window 36 in the door 30 is preferably shaped to correspond with the stepped recess 166 in the primary wall 150 of the well 140, enabling the consumer to watch the ants as they move down and up the incline inside the well and/or to monitor a level of insecticide in the well. Because only the outer half of the bait pack is visible through the window 36 in the door 30, the primary wall 150 of the inner half of the bait pack may be constructed without the stepped recess 166, i.e., the outer half of the bait pack does not have to be a mirror image of the inner half. However, as already noted, it is preferred that the two halves have identical structure to simplify manufacture.

To place the bait pack in the bait pack compartment, the inner half of the bait pack is received within the bait pack compartment, while the outer half of the bait pack faces outwardly and will be adjacent the inner surface of the primary door panel 82 when the door is closed (see FIG. 1). With the bait pack in the bait pack compartment, the outer surface of the second side wall 154 of the lower half of the well is in abutment with the first bait pack locating rib 120, and the molded semi-circular projection 162 is received within the semicircular cutout 122 therein. Further, the primary wall 150 of the inner half of the well is received within the elongated cutout 132 in the second bait pack locating rib 130. In addition, the outer surface of the first side wall 152 of the inner half of the well 140 is in abutment with the tab 80 formed on the second side outer wall 44 of the bait pack compartment 20. Finally, the neck portion 142 of the inner half of the bait pack is received within the cutout 70 in the second side outer wall 44, while that portion 145 of the outer edge 144 of the bait pack that surrounds the channel outer end 141 of the neck portion 142 and access channel 143 is received within the generally rectangular cutouts 72 formed adjacent and on either side of the semicircular cutout 70 in the second side outer wall 44.

When the door is closed, the neck portion on the outer half of the bait pack is received within the door cutout 100 while that portion 145 of the outer edge 144 of the bait pack that surrounds the outer end 141 of the neck portion 142 is received within the generally rectangular cutouts 102 formed adjacent and on either side of the door cutout 100. The bait pack is thereby locked in position within the bait pack compartment.

When sealed prior to use, the break-away tab 160 extends outwardly from the side of the halt pack (see FIG. 1) and, when the bait pack is installed, also extends outwardly from the housing 12 (see FIG. 2). As described above, the tab 160 is scored during manufacture to create a break line or score 180 (see FIG. 3). The tab may be removed by forcing the tab either all the way forward until broken or with a forward and back motion until broken. Removal of the tab activates the bait stake by opening the access channel 143 to allow insects to enter during use of the stake. FIG. 3 shows the ant and insect bait stake with the tab removed.

The integral ground engaging stake 22 extends below the bait pack compartment 20 and is configured as a V-shaped plate 181 with a pointed tip 182 to facilitate driving of the stake into the ground. The stake includes ribs 184 that are generally perpendicular to the plate 181 in order to increase the strength and buckling resistance of the stake 22. The top ends of the ribs abut the bottom wall 48 of the bait pack compartment 20. The bottom wall 48 of the bait pack compartment provides a flat surface 186 that acts as a positive stopping point for the depth of the stake when the stake is inserted into the ground. The flat upper surface 26 of the top plate 46 provides a stable surface for the consumer to push on when inserting the stake into the ground.

The two-part design of the ant and insect bait stake according to the first embodiment of the present invention ensures that the bait pack, which is separate from the stake housing and enclosed therein, is fully sealed prior to use to prevent any inadvertent release of its contained insecticide. The break-away tab allows the consumer to easily open the bait pack without tools prior to use of the bait stake. After the bait is depleted, the housing and bait pack are easily and neatly disposed of as a unit.

A second embodiment of the ant or insect bait stake according to the present invention, generally designated by reference numeral 250, is shown in FIGS. 13A-13C. The bait stake 250 includes a housing, generally designated by reference numeral 252, and a bait pack 254.

The housing 252 includes a base member 256 having a generally planar bottom wall 258 and upwardly directed side walls 260 that together define a bait pack compartment, generally designated by reference numeral 262. FIGS. 13A and 13C show the bait pack compartment 262 with the bait pack 254 fitted therein. The housing further includes a cover member 264 that, when secured to the base member, encloses the bait pack in the bait pack compartment 262 of the housing 252 as shown in FIG. 13C. The cover member 264 of the housing may be secured to the base member 256 with a snap fit or other suitable connection including a living hinge a long one edge.

As in the first embodiment, the bait pack includes at least one break-away tab, generally designated by reference numeral 275, having a neck portion 270 with an access channel 268 therein that extends outwardly through a cutout 267 in the side of the housing base member 256. As shown, the housing base member 256 can have two cutouts to accommodate bait packs having a dual access configuration (see FIG. 14). When the bait stake is assembled as shown in FIG. 13C, the tab can be broken off to open the access channel without the need for any tools or other devices, allowing easy opening of the bait stake by the user. The bait pack 254 may also be provided with a dome-shaped protrusion 272 that projects from the bottom side of the pack as shown in FIG. 13B. The protrusion 272 defines a corresponding inner recess (not shown) inside the bait pack which, while not a necessary feature, increases the volume of bait that the bait pack can contain.

A ground-engaging stake 266 projects downwardly from the lower surface of the bottom wall 258 of the housing base member 256 and is substantially perpendicular thereto so that when the stake is pushed into the ground, the housing 252 has a substantially horizontal orientation in use, lying substantially flat on the ground surface. The horizontal orientation of the housing 252 and the bait pack 254 therein places the access channel 268 in the tab 275 of the bait pack near ground level, making it very easy for ants crawling on the ground to find and enter the channel 268. The stake 266 may be integral with the housing base member or removably attached thereto. The stake can be configured to be removable or folded, such as along a living hinge to a position parallel with the base member for more compact shipping and storage of the bait stake prior to use thereof. With such a configuration, the stake would include a locking structure to ensure that the stake is held in the vertical position and will not fold when the user pushes it into the ground.

Figure 14:
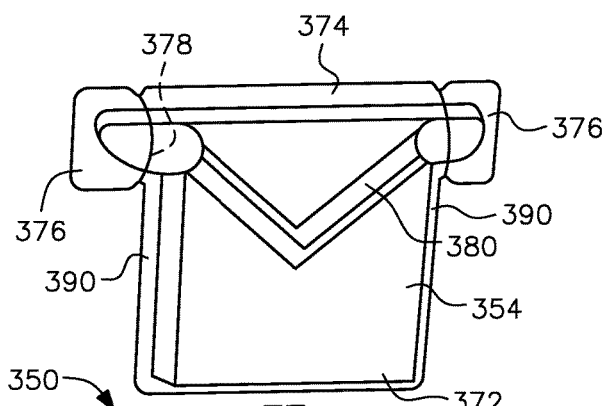
FIG. 14 shows an exploded view of an ant and insect bait stake according to a third embodiment of the present invention showing a bait pack having dual access channels in position to slide into an opening in the top of the housing for assembly of the bait stake.
Figure 14:
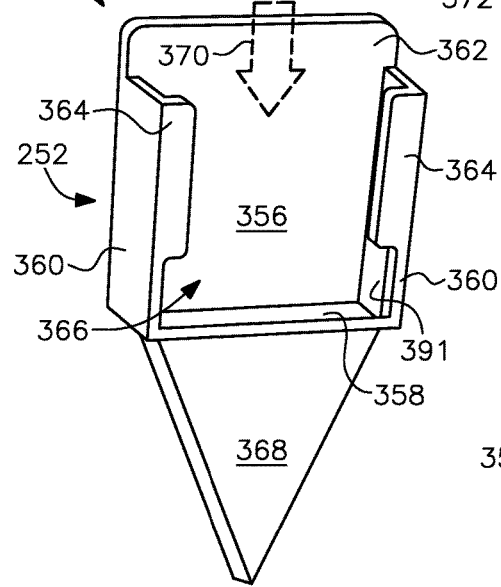
Figure 15:
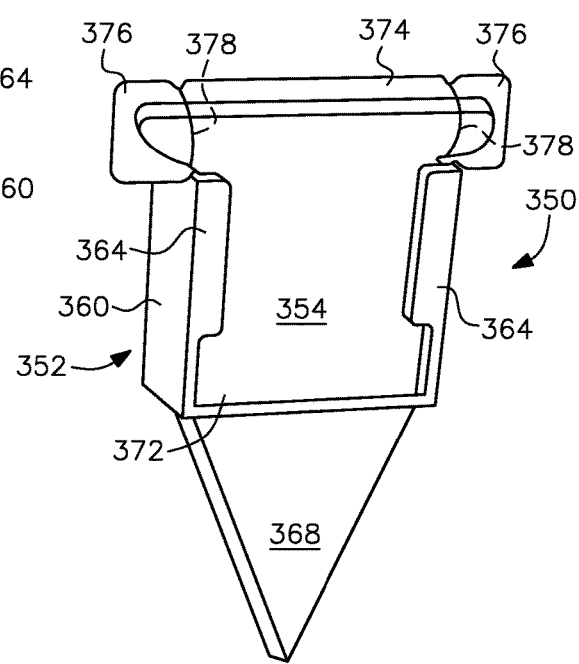
FIG. 15 is an assembled view of the bait stake of FIG. 14, but shown without the inclined ramps formed internally in the bait pack for crawling ants.
Figures 16, 17:
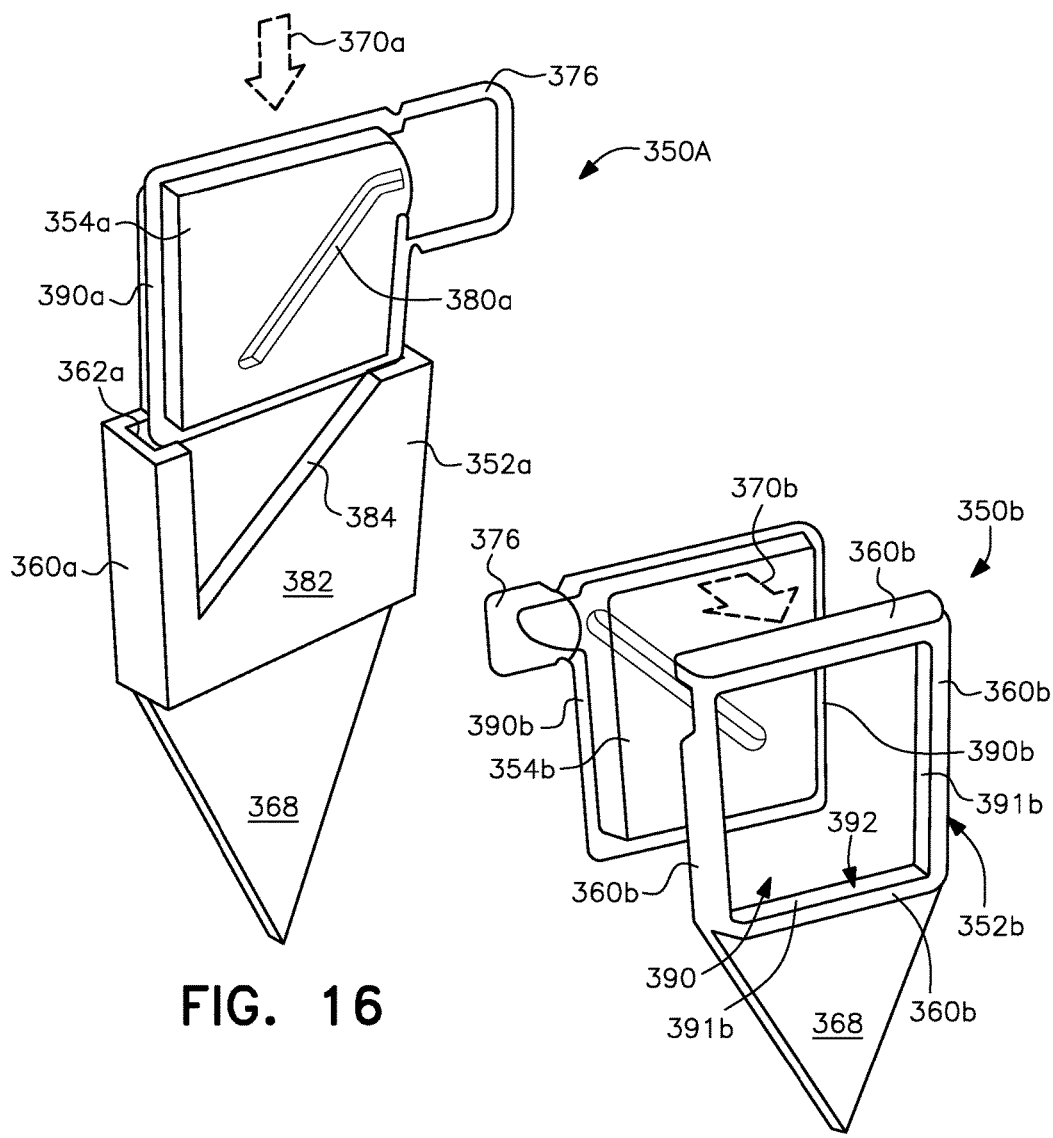
FIG. 16 shows a single access channel bait pack with viewing window and a housing with a front wall cutout to reveal the viewing window, the bait stake representing a first modified design of the third embodiment shown in FIGS. 14 and 15, again having a bait pack slidably inserted into an opening in the top of the housing.
FIG. 17 shows a single access channel bait pack with the housing formed as a frame having four side pieces and an open center that represents a second modified design of the third embodiment according to the present invention, the bait pack being slidably received into a recess formed by the side pieces on the back side of the housing frame.

A third embodiment of the ant or insect bait stake according to the present invention, generally designated by reference numeral 350, is shown in FIGS. 14 and 15. Alternate design configurations of the third embodiment are shown in FIGS. 16 and 17 and generally designated by reference numerals 350a and 350b, respectively.

With reference to FIGS. 14 and 15, the bait stake 350 includes a housing, generally designated by reference numeral 352, and a bait pack 354. The housing has a back wall 356, a bottom wall 358, two side walls 360 and an open top 362. An inwardly directed flange 364 projects from the front edge of each of the side walls 360 generally parallel with the back wall 356. The back wall 356, side walls 360, bottom wall 358 and flanges 364 form a bait pack compartment generally designated by reference numeral 366. The housing 352 also includes a ground-engaging stake 368 extending downwardly from the bottom wall 358 of the housing.

The bait pack 354 is slidably inserted through the open top 362 of the housing as shown by the arrow 370 in FIG. 14, and is fully inserted when the bottom 372 of the bait pack is positioned adjacent the bottom wall 358 of the housing as shown in FIG. 15. The flanges 364 keep the bait pack contained in the housing in a substantially upright position adjacent or against the back wall 356. The upper edge 374 of the bait pack remains accessible from outside the housing and, in the particular configuration shown, is provided with a dual access construction, having two break-away tabs 376 defining two bait access channels 378 on opposing sides of the bait pack. Optionally, the bait pack may include an internal stepped incline or inclined ramp(s) 380 for the ants to climb down as in the first embodiment. This inclined structure is visible when the bait pack is formed by a clear or translucent material during manufacture as shown in FIG. 14.

The bait pack 354 fits in the bait pack compartment 366 with a snug frictional fit between the somewhat flexible side edges 390 of the bait pack and inner surfaces 391 of the side walls 360 of the housing 352. The snug fit prevents inadvertent separation of the bait pack and housing during normal handling thereof. The bait pack may, however, be grasped along its upper edge 374 and pulled out by the user and replaced with a new bait pack as necessary.

In the alternate design configuration of the bait stake 350a shown in FIG. 16, the housing 352a has a partial front wall 382, rather than the side wall flanges of bait stake 350, to retain the bait pack in the bait pack compartment. The partial front wall 382 has an angled cutout 384 to align with the inclined ramp 380a formed in the bait pack. The bait pack is slidably inserted through the open top 362a in the downward direction indicated by arrow 370a and held by a frictional fit between the bait pack side edges 390a and the inner surfaces (not visible) of the housing side walls 360a. As shown, the bait pack has a single tab 376, although two tabs forming a dual access bait pack configuration could be used. The remainder of the components of the housing correspond with those already described in connection with FIGS. 14 and 15 and will not be repeated.

The further alternate design configuration of the bait stake 350b shown in FIG. 17 has a housing generally designated by reference numeral 352b. The housing is in the form of a frame with four side pieces 360b that define an open center generally designated by reference numeral 390. The side pieces 360b create a recess generally designated by reference numeral 392 in the back of the frame housing 352b with the perimeter of the opening in the rear of the frame being larger than the perimeter of the opening in the front of the frame. As used herein, "rear" is used to designate that side of the housing nearest the bait pack as it is shown in FIG. 17, and "front" is used to designate the opposite side of the housing facing away from the bait pack; the view shown in FIG. 17 is from, the front side of the bait stake 350b. The bait pack 354b is slideably received within the recess 392 in a generally horizontal direction from back to front as indicated by the arrow 370b and is held therein with a snug frictional fit between the somewhat flexible outer side edges 390b of the bait pack and the inner surfaces 391b of the frame recess 392. As with bait stake 350, the bait pack may be removed and replaced by the user as necessary. The bait packs of bait stakes 350a and 350b are both shown with a single access configuration having one break-away tab 376, however either or both may be modified to include a dual access configuration like that of bait stake 350.

Figure 18:
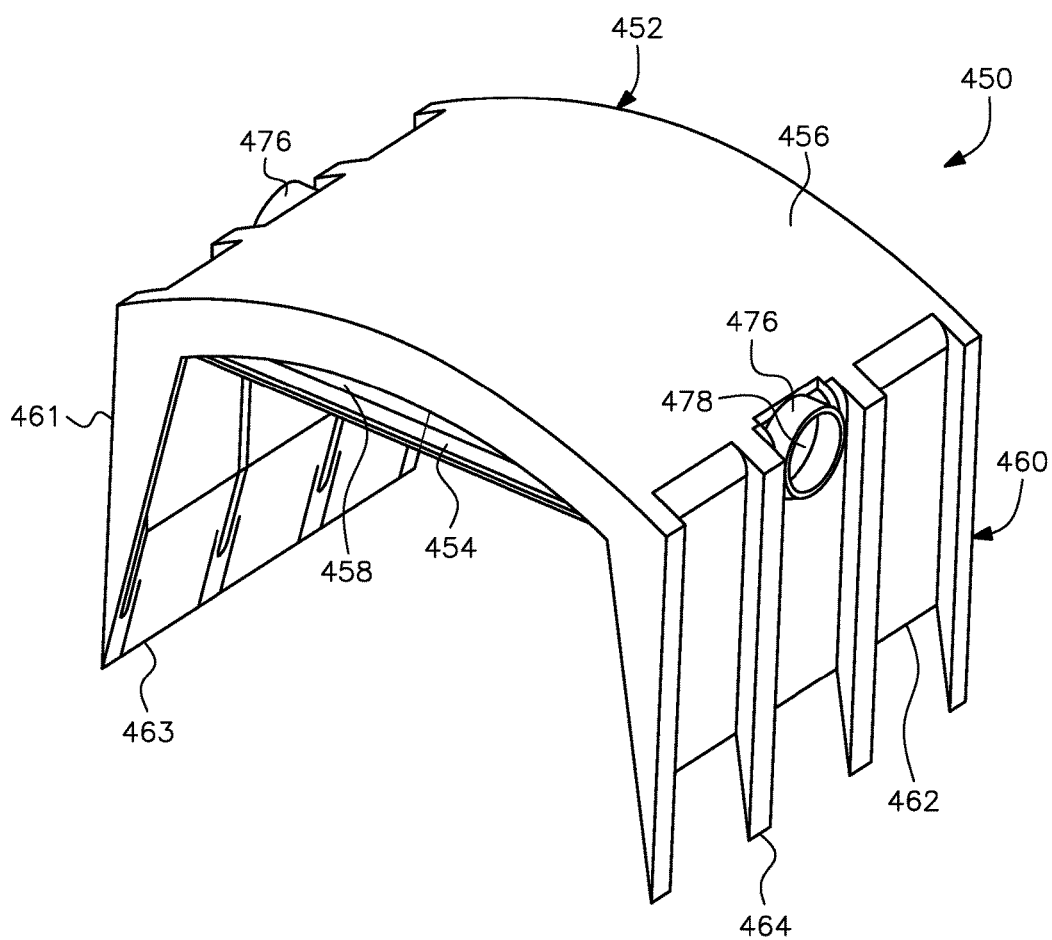
FIG. 18 is a perspective view of an ant and insect bait stake according to a fourth embodiment of the present invention, the housing having a slightly convex upper surface forming a shell-like configuration with two integral ground engaging side walls, the bait pack being secured horizontally against a concave underside of the shell-like housing and having two tabs with access channels projecting outwardly from the two ground engaging side walls, respectively.
Figure 19A:
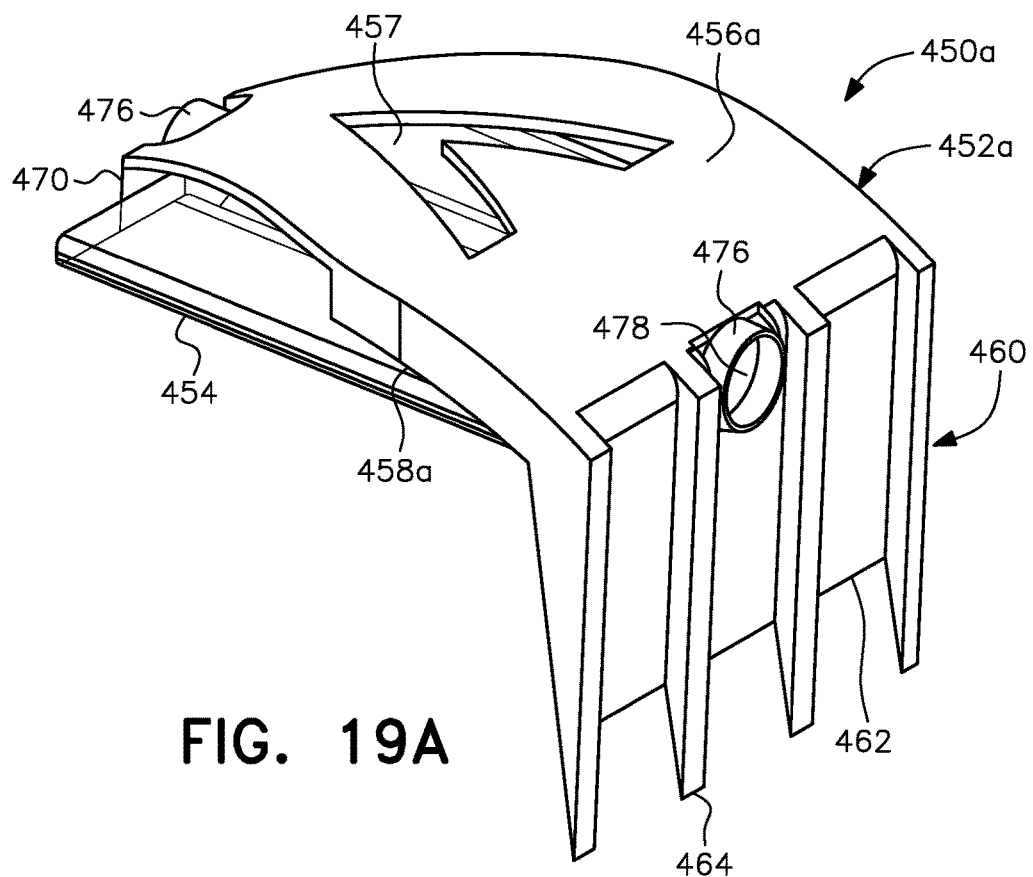
FIG. 19A is an upper perspective view of a single access channel bait pack and a shell-like housing having a single ground engaging side wall that represents a modified design of the fourth embodiment shown in FIG. 18.
Figure 19B:
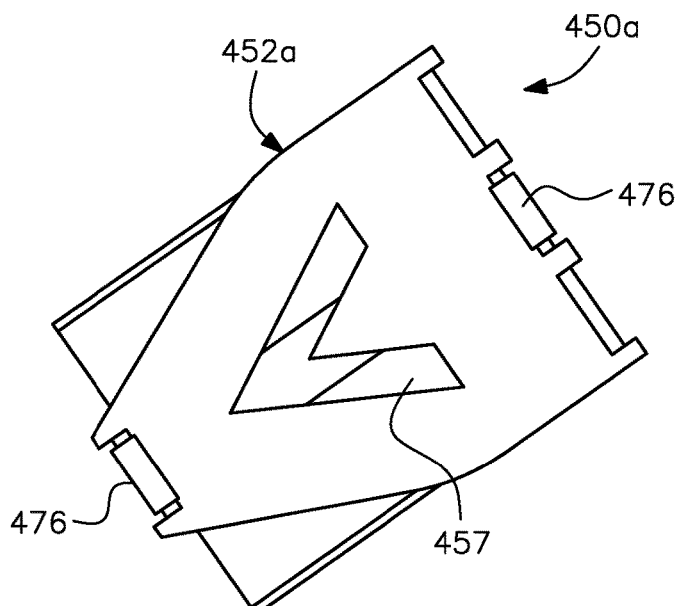
FIG. 19B is a top view of the bait stake shown in FIG. 19A, showing an optional cutout in the upper surface of the shell-like housing for a logo or graphic.

A fourth embodiment of the bait stake, generally designated by reference numeral 450, is shown in FIG. 18, with a variant thereof represented by the bait stake 450a shown in FIGS. 19A and 19B. According to the fourth embodiment of bait stakes 450 and 450a, the housing, generally designated by reference numeral 452, 452a, has a slightly convex upper surface 456, 456a with a generally corresponding concave lower surface 458, 458a to form a shell-type configuration. Alternatively, the upper surface of the housing could be flat. The shell-like housing also has at least one integral ground engaging side wall generally designated by reference numeral 460.

As shown in FIG. 18, the bait stake 450 has two ground engaging side walls 460 and 461. The bottom edge 462 of the first ground engaging side wall 460 includes a plurality of downwardly directed prongs 464 while the bottom of the second ground engaging side wall 461 is formed as a single tapered edge 463. These two side walls 460, 461 are representative only, as the bait stake may nave two side walls with prongs 464 or two side walls with tapered edges 463 or one of each type of side wall as shown in FIG. 18. Alternatively, as in FIG. 19A, the bait stake 450a may have only one ground engaging side wall 460, which may be pronged or tapered. When configured with only one ground engaging side wall, the opposing side of the shell-like housing has an extension 470 through which a second bait pack tab may extend when the bait pack has a dual access configuration like that shown.

In both bait stakes 450 and 450a, the bait pack 454 or reservoir is secured against the concave lower surface 458, 458a of the shell-like housing 452, 452a, such as with a snap fit, and includes at least one break-away tab having a neck portion 476 with an access channel 478 therein. In the embodiments shown in FIGS. 18 and 19A, the break-away portion of each tab has already been removed to open its respective access channel 478. In the embodiment shown in FIG. 18, the bait pack has two neck portions 476 with corresponding access channels 478 that extend outwardly from the opposing ground-engaging side walls adjacent the shell-like housing's upper surface. In the embodiment shown in FIG. 19A, one neck portion 476 with access channel 478 of the tab structure projects from the single ground engaging side wall 460 and the other tab structure projects through an opening in the extension 470 of the shell housing 452a. While both bait stakes 450 and 450a are shown with a dual access channel configuration, either could alternatively be configured with a single access channel. Additionally, bait stake 450a is provided with an optional cutout 457 in the shell housing for display of a logo or graphic.

In use, the ground engaging side wall or side walls 460, 461 of bait stakes 450, 450a are forced into the ground so that the generally flat but slightly convex upper surface of the shell-like housing has a horizontal orientation that is nearly flush with the ground surface. As in the second embodiment, the horizontal orientation of the housing and the bait pack secured to the underside thereof places the access channel or channels of the bait pack near ground level, facilitating ant entry.

Figure 20:
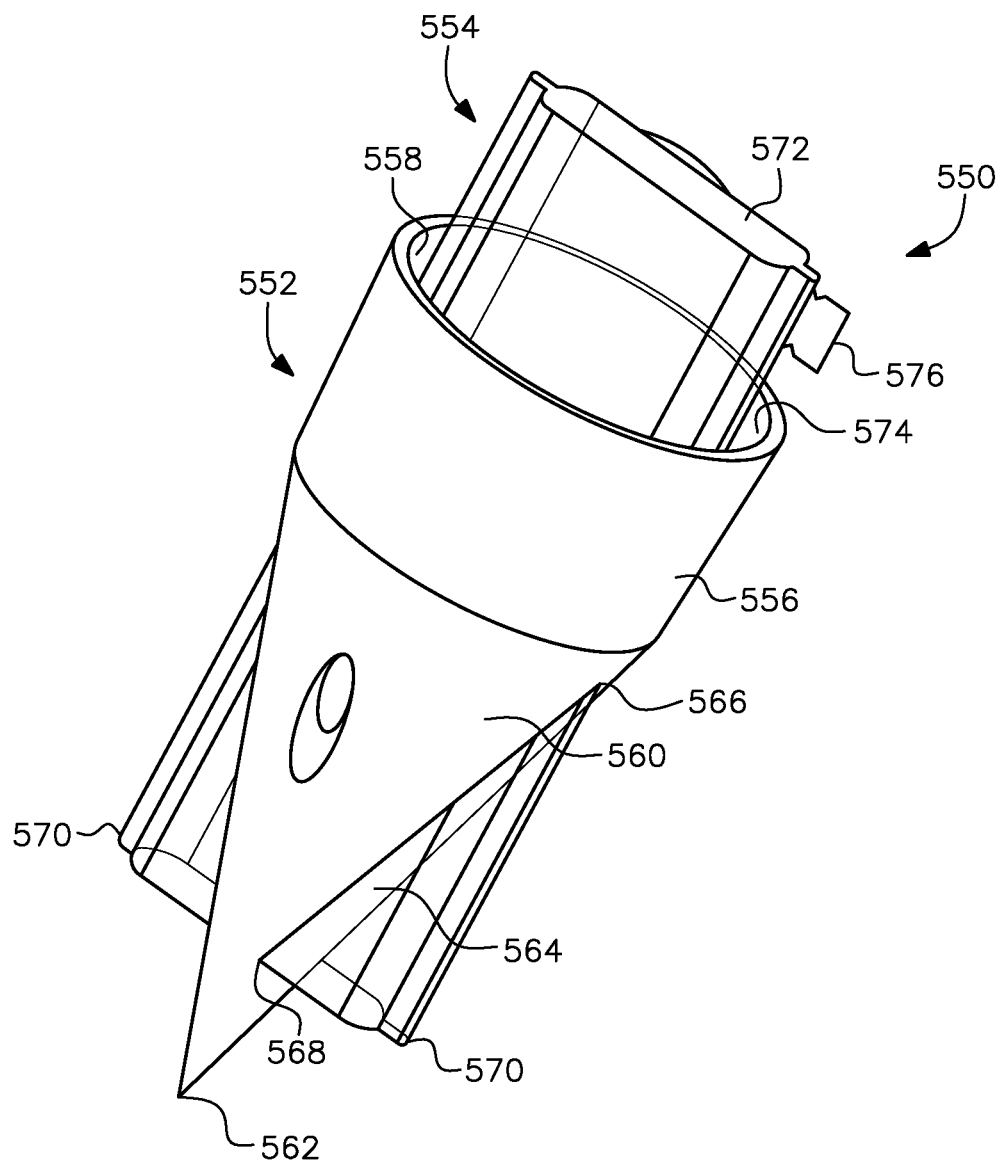
FIG. 20 shows an ant and insect bait stake according to a fifth embodiment of the present invention, the housing configured as a substantially hollow capsule and the bait pack inserted into and partially projecting from the housing.

A fifth embodiment of a bait stake according to the present invention and generally designated by reference numeral 550 is shown in FIG. 20. The bait stake 550 includes a housing generally designated by reference numeral 552, and a bait pack generally designated by reference numeral 554 that is secured within the housing while partially projecting therefrom.

The housing 552 is configured as a substantially hollow capsule having a generally cylindrical upper portion 556 with an open top 558 and a conical lower portion 560 with a pointed tip 562. Two opposing slits 564 are formed in the side wall of the lower portion 560. The slits 564 extend in a generally vertical orientation from an upper end 566 near the cylindrical portion 556 of the housing 552 to a lower end 568. The lower end 568 of the slits 564 is spaced above the pointed tip 562.

In the configuration shown in FIG. 20, the bait pack 554 has a generally rectangular shape and is inserted into the open top 558 of the housing capsule and pushed downwardly into the conical lower portion 560. When fully inserted, the two lower corners 570 of the bait pack pass through the two opposing slits 564, respectively, to project outwardly from the conical lower portion 560 and vertically spaced above the pointed tip 562. The upper end 572 of the bait pack projects above the rim 574 of the cylindrical portion 556 of the housing 552. The upwardly projecting end 572 of the bait pack includes at least one break-away tab 576 having a neck portion with an access channel therein that extends outwardly from adjacent the upper end 572 of the bait pack. The break-away tab 576 is easily removed to open the access channel in the same way as in the previous embodiments already described herein.

In use, the cylindrical upper portion 556 of the capsule and the upper end 572 of the bait pack generally remains above the ground. The conical lower portion 560 of the capsule, aided by the pointed tip 562, provides the necessary rigidity to the bait pack 554 such that the lower end with bottom corners 568, 570 of the bait pack can be forced into the ground along with the housing. By pushing the entire housing into the ground, the access channel is brought near to ground level for ease of ant access while the bait pack is securely protected and held in place by both the housing and the ground into which it has been pushed, making the bait stake 550 very stable in use.

While not shown, the capsule housing and bait pack may be configured such that the bait pack does not project out of the sides or top of the housing. Instead, the bait pack may have a generally conical lower end and be fully contained within the housing, with only an outwardly extending tab near a top of the bait pack. If the top of the housing is open as shown in FIG. 20, the tab may project through the open top. Such a configuration would allow nearly the entirety of the bait pack to be underground within the housing. Alternatively, one side of the upper portion of the housing may include an aperture through which the tab of the bait pack extends at about ground level as in the second and fourth embodiments.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. An insect bait stake comprising a housing and a sealed inner bait pack that is separate from the housing, said housing including a bait pack compartment for receiving the bait pack which contains a quantity of liquid bait, and a ground engaging member that is integral with and extends below the bait pack compartment, said ground engaging member being configured to be pushed into the ground, said bait pack including at least one neck portion having a break-away tab that extends outwardly of the housing, the tab sealing an access channel therein that is opened when the tab is broken away to allow insects to enter the bait pack through the opened access channel and move toward the liquid bait, the tab being located above a level of the quantity of liquid bait contained in the bait pack and being removable by the consumer without any tools or other devices when the insect bait stake is ready for use and, when the bait stake is in use, the quantity of liquid bait remaining in the bait pack, where said quantity of liquid bait is accessed by insects that have entered the bait pack through the opened access channel.

2. The insect bait stake as set forth in claim 1, wherein the housing and bait pack have a generally horizontal orientation generally parallel with ground surface when the ground engaging member has been pushed into the ground and said housing, bait pack and access channel being adjacent the ground surface.

3. The insect bait stake as set forth in claim 2, wherein the housing includes a base member and a cover member that is removable and reattachable to the base member with a snap fit, the bait pack being positioned between the cover member and the base member when the bait stake is assembled for use.

4. The insect bait stake as set forth in claim 1, wherein the bait pack includes a dome-shaped protrusion on an outer surface thereof, said protrusion forming a recess inside the bait pack to increase a bait holding capacity of the bait pack.

5. The insect bait stake as set forth in claim 1, wherein said bait pack is slideably inserted into the bait pack compartment through an open side or an open top of said housing.

6. The insect bait stake as set forth in claim 5, wherein the housing includes a back wall, a bottom wall, two side walls and a partial front wall to define the bait pack compartment, said housing having an open top through which the bait pack is inserted into the bait pack compartment, said bait pack being secured within the housing with a friction fit.

7. The insect bait stake as set forth in claim 6, wherein said partial front wall is formed by a flange extending inwardly from each of said side walls, said flanges being generally parallel with said back wall.

8. The insect bait stake as set forth in claim 6, wherein said partial front wall is generally parallel with said back wall and has a cutout therein to display a side view of the bait pack.

9. The insect bait stake as set forth in claim 5, wherein said housing includes four pieces forming a frame with an open center, said frame creating a recess in a rear side thereof, said bait pack being slideably inserted into said recess and held in the frame by a friction fit between outer edges of the bait pack and adjacent inner surfaces of the frame recess.

10. The insect bait stake as set forth in claim 9, wherein said bait pack is removable and replaceable with the housing being reused.

11. The insect bait stake as set forth in claim 6, wherein said bait pack is removable and replaceable with the housing being reused.

12. The insect bait stake as set forth in claim 6, wherein said bait pack has two break-away tabs with access channels on opposing sides of the bait pack and adjacent an upper edge thereof.

13. The insect bait stake as set forth in claim 1, wherein the housing includes a generally convex upper surface and a generally concave lower surface to form a shell-like housing, said bait pack being coupled to said concave lower surface, said ground engaging member including at least one ground engaging side wall that extends downwardly from an edge of said shell-like housing, said bait pack with said access channel and said housing lower surface being adjacent to ground surface when the side wall is pushed into the ground.

14. The insect bait stake as set forth in claim 13, wherein the shell-like housing has two ground engaging side walls on opposing sides of said housing.

15. The insect bait stake as set forth in claim 13, wherein at least one of the ground engaging side walls has a plurality of downwardly directed prongs.

16. An insect bait stake comprising a housing and a sealed inner bait pack that is separate from the housing, said housing including a bait pack compartment for receiving the bait pack and a ground engaging member that extends below the bait pack compartment, said housing being configured as a substantially hollow capsule having a generally cylindrical upper portion with an open top and a conical lower portion with a pointed tip forming the ground engaging member, said bait pack being received within said housing through said open top, said bait pack including at least one breakaway tab that seals an access channel therein that is opened when the tab is broken away to allow insects to enter the bait pack through the opened access channel, the tab being removable by the consumer without any tools or other devices when the insect bait stake is ready for use, said conical lower portion of the housing having opposing slits formed therein, lower corners of a lower end of said bait pack projecting through said slits when the bait pack is mounted in the housing.

17. The insect bait stake as set forth in claim 16, wherein said slits extend in a generally vertical orientation from an upper end near the cylindrical upper portion of the housing to a lower end that is spaced above the pointed tip.

18. The insect bait stake as set forth in claim 17, wherein said conical portion along with the bait pack lower end fitted therein is underground when the ground engaging lower conical portion is pushed into the ground.

19. The insect bait stake as set forth in claim 16, wherein said bait pack is removable and replaceable with the housing being reused.

* * * * *